(12) United States Patent
Lu

(10) Patent No.: US 8,465,639 B2
(45) Date of Patent: Jun. 18, 2013

(54) PIN BASED METHOD OF PRECISION DIAMOND TURNING TO MAKE PRISMATIC MOLD AND SHEETING

(75) Inventor: Xiao-Jing Lu, Bloomfield, CT (US)

(73) Assignee: ORAFOL Americas Inc., Avon, CT (US)

( * ) Notice: Subject to any disclaimer, the term of this patent is extended or adjusted under 35 U.S.C. 154(b) by 878 days.

(21) Appl. No.: 12/082,416

(22) Filed: Apr. 9, 2008

(65) Prior Publication Data

US 2009/0255817 A1 Oct. 15, 2009

(51) Int. Cl.
*C25D 1/10* (2006.01)
*C25D 1/00* (2006.01)

(52) U.S. Cl.
USPC ................................. 205/70; 205/79

(58) Field of Classification Search
USPC ...................................... 205/70, 79
See application file for complete search history.

(56) References Cited

U.S. PATENT DOCUMENTS

| | | |
|---|---|---|
| 1,591,572 A | 7/1926 | Stimson |
| 3,632,695 A | 1/1972 | Howell |
| 4,243,618 A | 1/1981 | Van Arnam |
| 4,460,449 A | 7/1984 | Montalbano |
| 5,812,315 A | 9/1998 | Smith et al. |
| 6,015,214 A | 1/2000 | Heenan et al. |
| 6,206,525 B1 | 3/2001 | Rowland et al. |
| 6,540,367 B1 | 4/2003 | Benson et al. |
| 6,626,544 B2 | 9/2003 | Lu et al. |
| 2002/0141060 A1 | 10/2002 | Lu et al. |
| 2007/0007441 A1 | 1/2007 | Gubela |
| 2007/0014012 A1 | 1/2007 | Smith |
| 2007/0081244 A1 | 4/2007 | Sawayama et al. |

FOREIGN PATENT DOCUMENTS

| | | |
|---|---|---|
| DE | 44 10 994 A1 | 10/1995 |
| EP | 0 269 329 A2 | 6/1988 |

OTHER PUBLICATIONS

International Search Report for International Patent Application No. PCT/US2009/000522 (May 13, 2009).
Written Opinion of the International Searching Authority for International Patent Application No. PCT/US2009/000522 (May 13, 2009).

*Primary Examiner* — Keith Hendricks
*Assistant Examiner* — Stefanie Sherrill
(74) *Attorney, Agent, or Firm* — LeClairRyan, a Professional Corporation

(57) ABSTRACT

A system, and corresponding method for use, for providing a mass-producible retroreflective material, or sheeting, featuring full cube corner pins is presented. The full cube corner shaping may be provided with the use of a diamond turning tool. The diamond turning tool may be used to simultaneously manufacture a number of pins. The pins may be used to form a mold featuring a triangular or full cube corner surface formation.

14 Claims, 19 Drawing Sheets

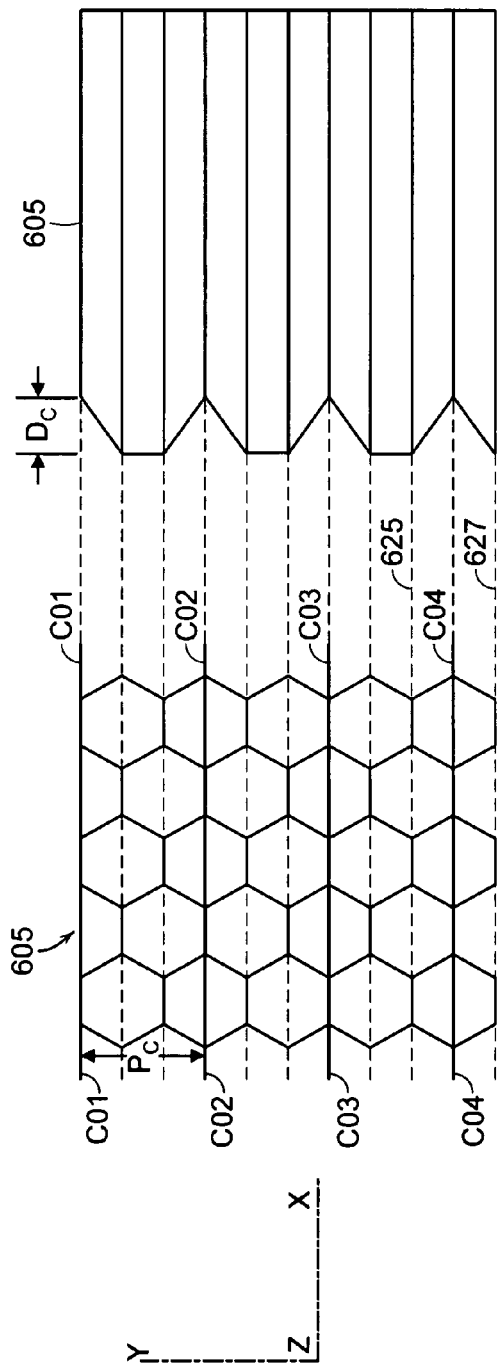
FIG. 6A
FIG. 6B
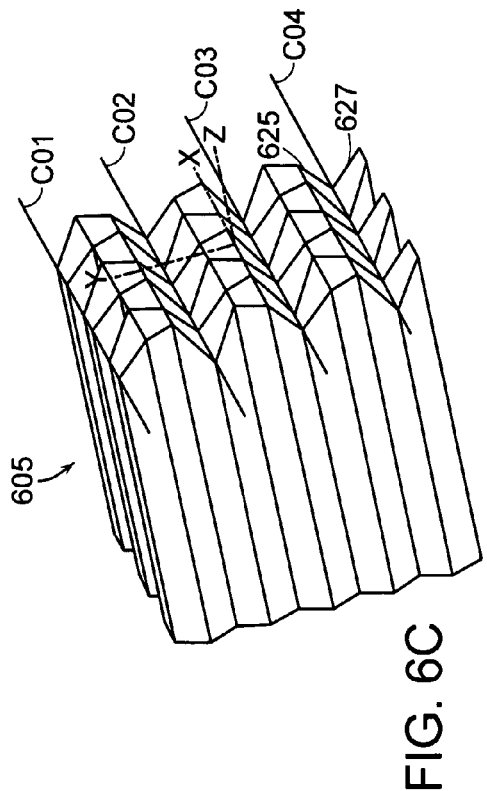
FIG. 6C

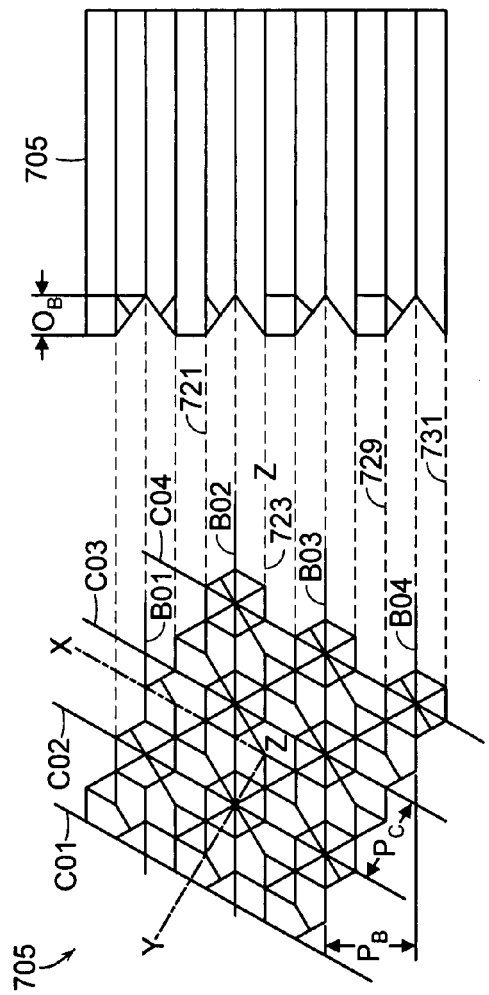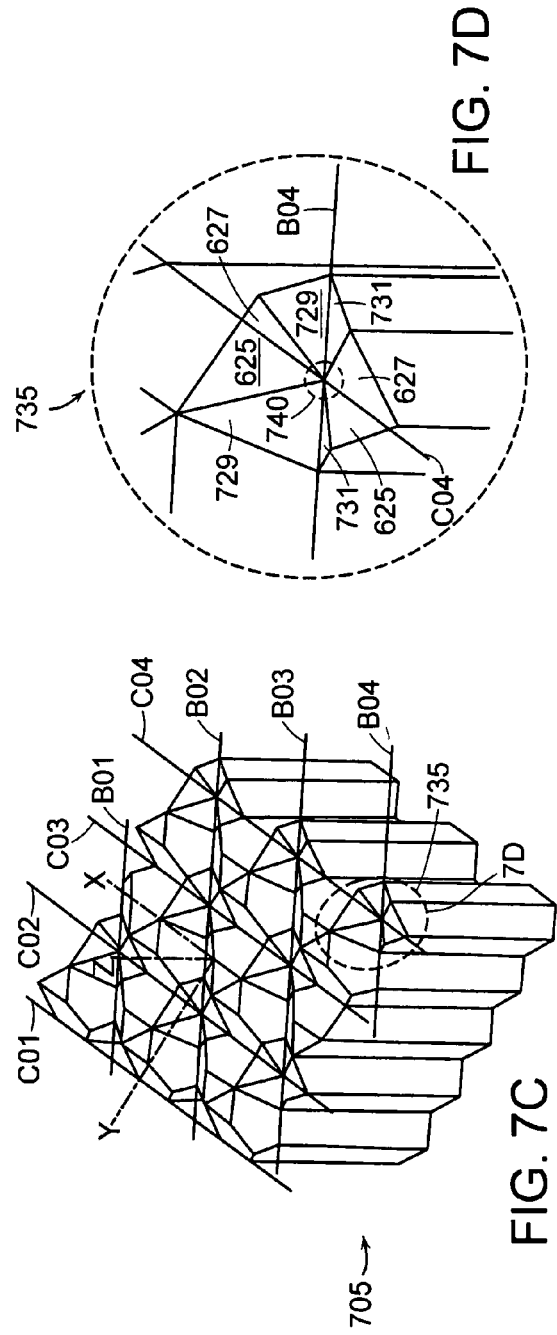
FIG. 7A
FIG. 7B
FIG. 7C
FIG. 7D

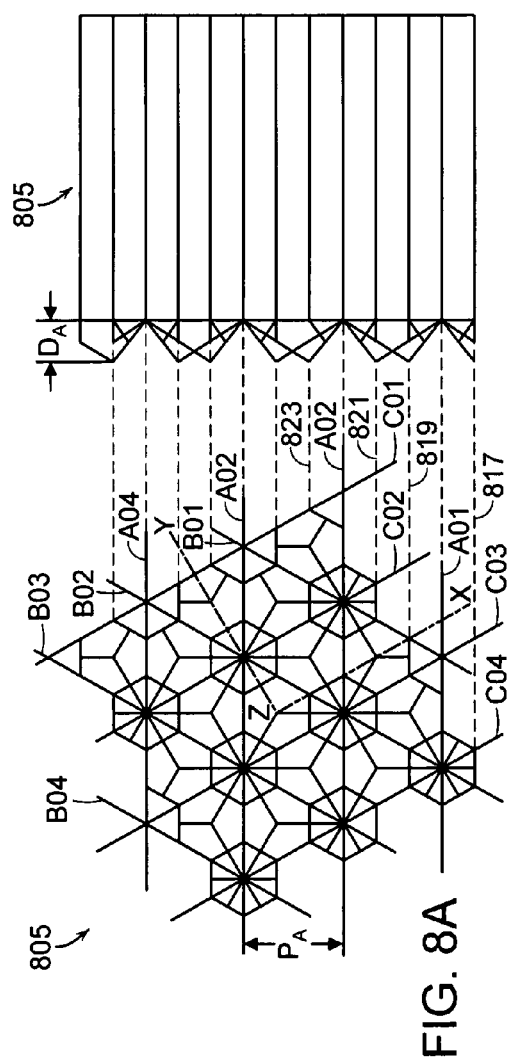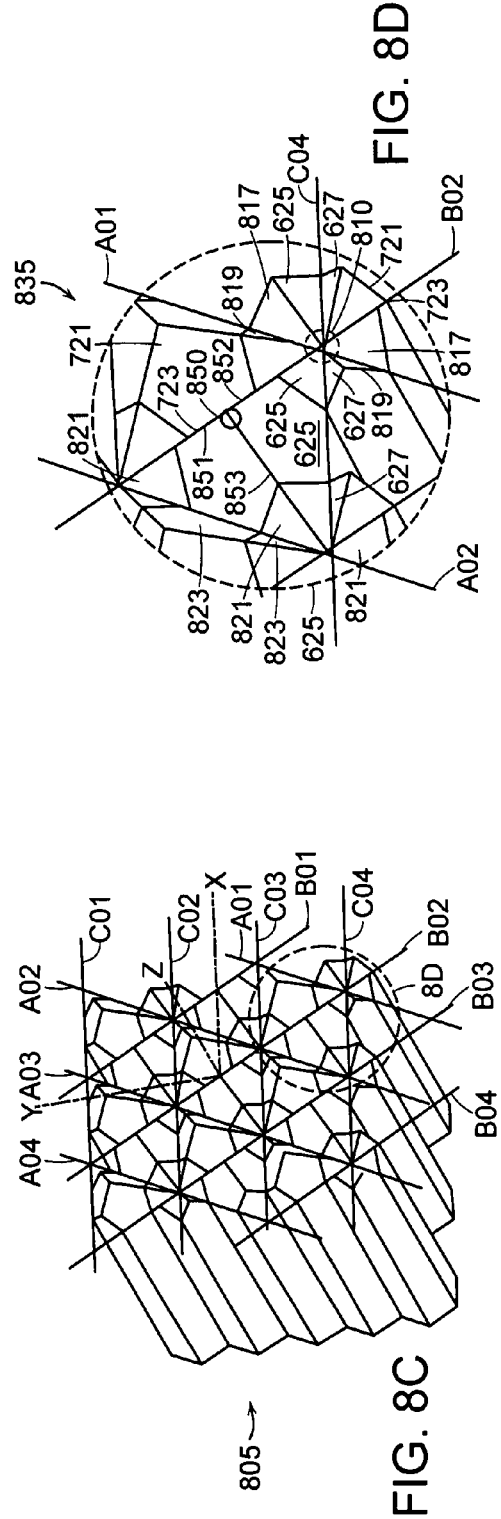

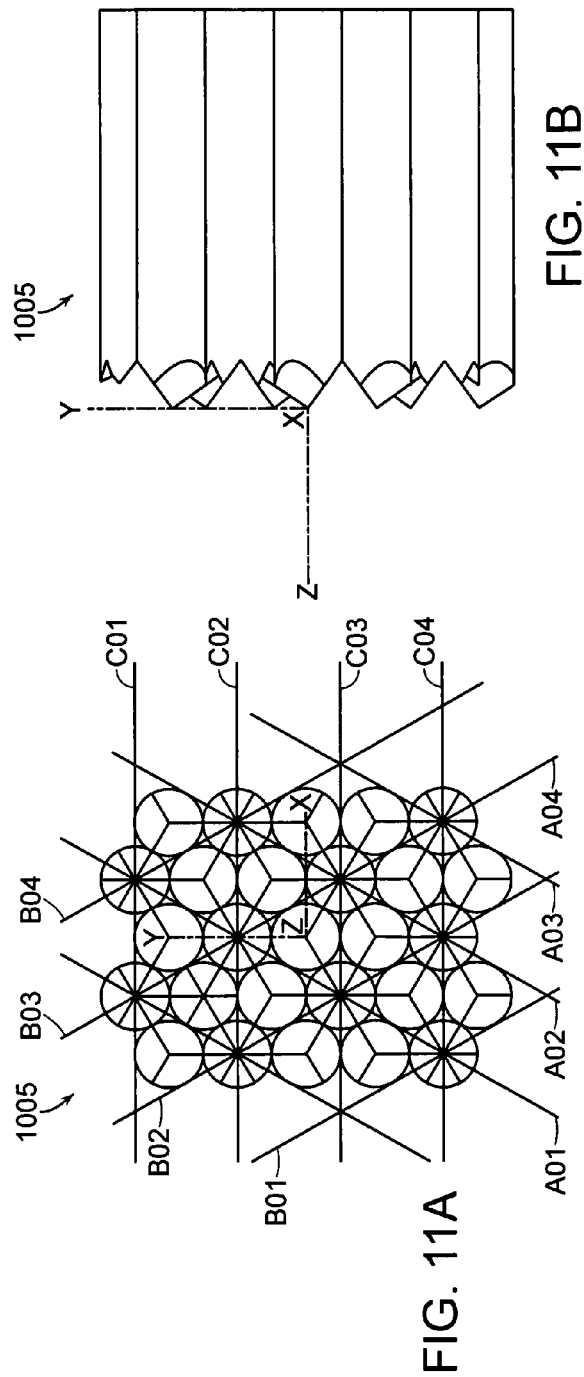

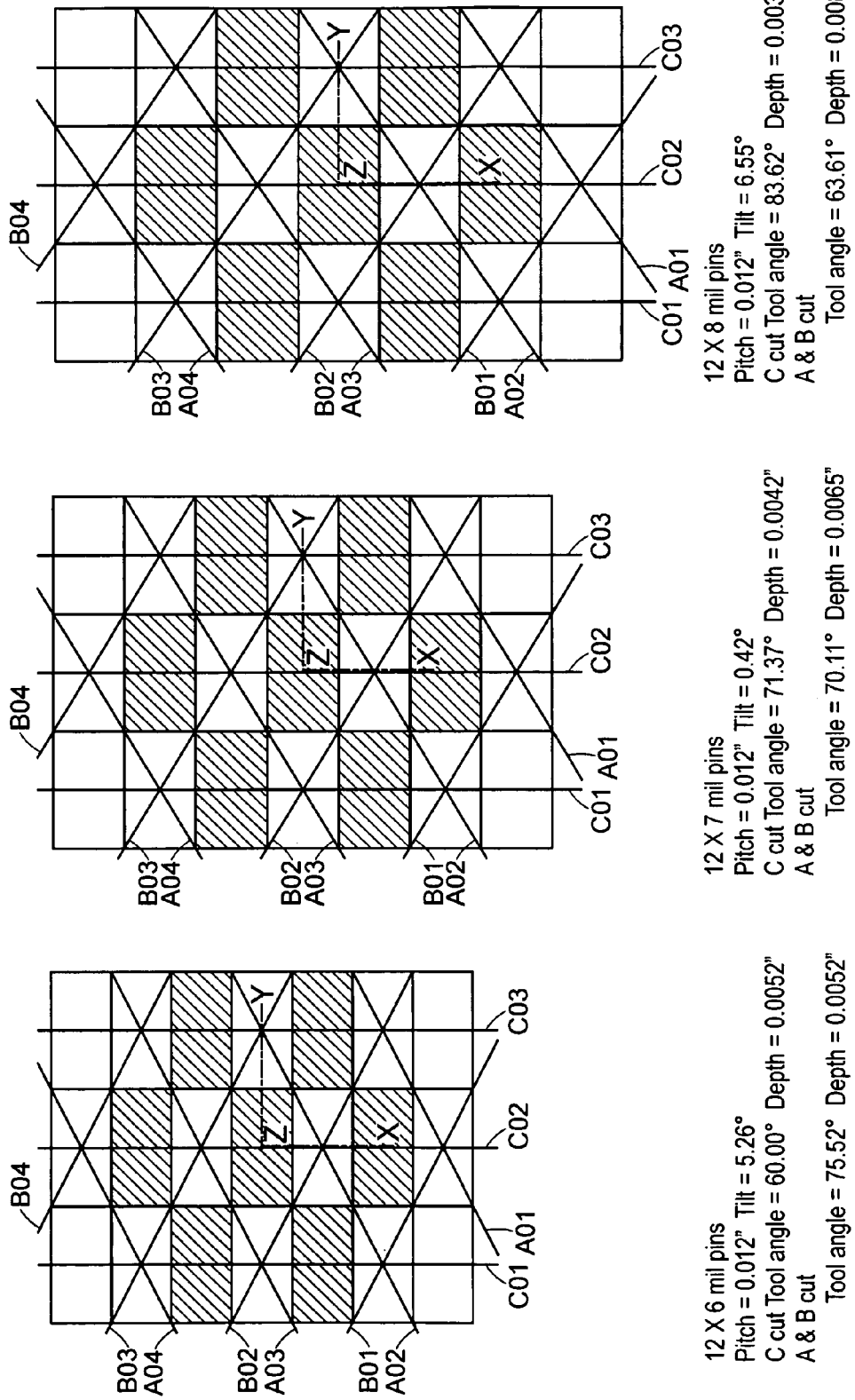

12 X 8 mil pins

12 X 7 mil pins

12 X 6 mil pins

Diamond Cutting Results

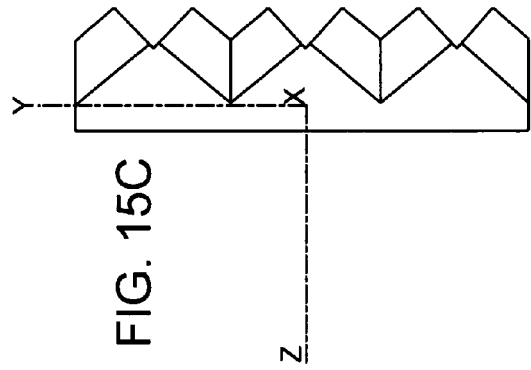
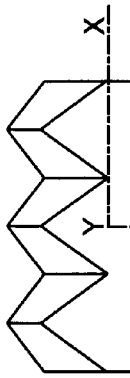
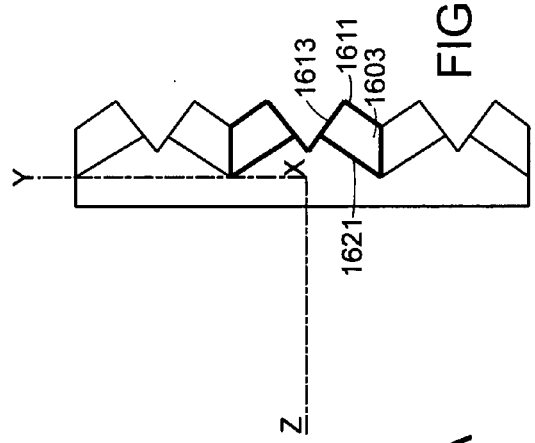
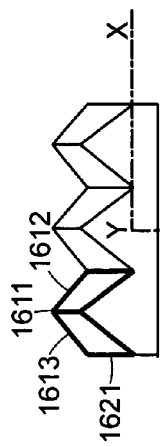
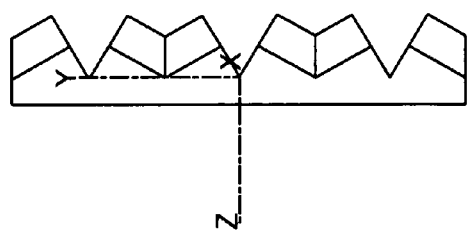
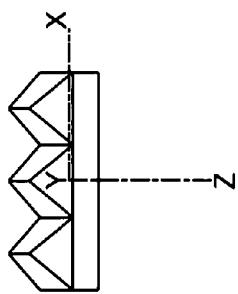

PIN BASED METHOD OF PRECISION DIAMOND TURNING TO MAKE PRISMATIC MOLD AND SHEETING

BACKGROUND

Retroreflective materials are used in everyday life and may be seen in road surfaces, road signs, vehicles, and clothing. Retroreflective materials are configured to reflect light, or other forms of radiation, back to an originating source regardless of an angle of incidence.

One common type of retroreflector is provided by a surface of cube corners, or microprisms. Two types or cube corners are typically utilized, a full cube corner and a triangular cube corner. A typical full cube corner has three square facets and a hexagonal aperture.

FIG. 1A illustrates the reflective properties of a full cube corner 101. A typical full cube corner has three square facets 103, 105, and 107. The full cube corner 101 has a hexagonal aperture 109 that is also the effective area of the full cube corner when incident light is in a 0° entrance angle. The incident light within the effective area is constructively reflected by three facets 103, 105, and 107 and may pass through the effective area again so as to goes back to the incident direction.

A full cube corner 101 may be best suited for applications in which an angle of entrance, or an angle of incident light, is between 0°-30°. In the 0°-30° angle of incident light range, the entire inner cube surface may behave as a retroreflector, where the entire hexagonal aperture may be regarded as a retroreflective area and substantially all of the incident light will be retro-reflected by three internal reflections of three facets. Therefore, any incoming light 102 entering the full cube corner through the aperture within an angle of incident light range of 0°-30° may be retro-reflected regardless of where the incoming light 102 strikes the full cube corner 101. This enables the full cube corner to reflect light 104 in a substantially parallel path in comparison to the incident light 102, with approximately 0°-2° of deviation. The deviation of the retroreflected light may depend on any deviations associated with the 90° formed by the intersection of the three facets 103, 105, and 107 of the full cube corner. Retroreflective articles formed with molds comprising full cube corner 101 microstructures may be ideal for certain situations. For example, full cube corner retroreflectors may be ideal for retroreflective articles intended to be used on items such as highway signs, automobiles, or clothing where a person may likely be viewing reflected light from these items within the observation angle of 0°-2° at the entrance angle range of 0°-30°.

In contrast, FIG. 1B illustrates the reflective properties of a triangular cube corner 111. A typical triangular cube corner may include three right angle isosceles facets 113, 115, and 117 and may have an equilateral triangular aperture. Because the triangular cube corner is not symmetrical, the effective area of the triangular cube corner, through which the 0° incident light is retro-reflected by three facets 113, 115, and 117, may be defined by a hexagonal area 119. The hexagonal area 119 is approximately ⅔ of the triangular aperture of the triangular cube corner. The remaining ⅓ of the triangular aperture is known as a redundant area.

The triangular cube corner 111 may be better suited for other applications in which an angle of incident light is in the range of 30°-60°, where the redundant area may be added to be active in the retro-reflection of light. The effective area of the triangular cube corner may be larger than that of the full cube corner at entrance angle range of 30°-60°. The triangular cube corners 101 may be ideal for situations where the retroreflected light is desired to be observed at entrance angle 30°-60° range. An example of such a situation may include a motorist viewing the light reflected from a large overhead sign, highway signs, and personal safety.

The cube corners of either type may be formed, in one method, by a mold having a surface with the microstructure of the desired shape. U.S. Pat. No. 6,015,214 issued to Heenan et. al., on Jan. 18, 2000, and assigned to Stimsonite Corporation (herein referred to as Heenan), describes a first method for forming microcube molds used in providing retroreflective articles. This method utilizes a number of plates, or shims, stacked together. A diamond cutting tool can than be used to form a set of 90° v-shaped grooves on the top surface of the plate stack. Alternating individual plates are then shifted to provide a full cube corner configuration. While the resulting shifted cube corner configuration contains three exposed facets, only two of the three facets are smooth enough to be reflective (see Heenan, FIGS. 3-5).

Heenan further describes a second method for forming the molds used in making retroreflective articles. In this second method, a retroreflective cube corner surface is formed by cutting v-shaped grooves in a stack of plates and adjoining alternating plates rotated 180°. The configuration of the microcubes in the second method results in the elimination of the exposed non-reflective facets (Heenan, FIGS. 18-21).

The methods of diamond turning are also illustrated in FIGS. 1 and 2 of U.S. Pat. No. 6,206,525 issued to Rowland et. al., on Mar. 27, 2001, and assigned to Reflexite Corporation. Additional illustrations of non-pin based methods of diamond turning may also be found in FIG. 3 of U.S. Pat. No. 6,626,544 issued to Lu et. al., on Sep. 30, 2003, and also assigned to Reflexite Corporation.

A third known method of forming molds used in the production of retroreflective articles involves the use of bundles of pins. First, each individual pin of a "pin bundle" are separately machined in the shape of a desired cube corner. The separately machined pins are then bundled together to form a microcube surface configuration featuring a collection of cube corners. The microcube surface configuration may thereafter be used to form a mold.

SUMMARY

There are prior art methods using pin bundles to provide microcube surfaces that served as a mold. However, the pins must be individually manufactured, which is costly and time consuming.

An apparatus for making a mold, and corresponding method, for forming a mass-producible retroreflective sheeting is presented. The apparatus may comprise a first mechanical fixture configured to stack a plurality of pins, with the pins forming a pin bundle. Each of the stacked pins may have a regular hexagonal cross section, a circular cross section, or a rectangular cross section. The pin cross section may also be of an irregular hexagonal shape or elliptical shape. Each of the pins stacked in the mechanical fixture may or may not have exactly the same cross section.

Using the technique of diamond turning, three sets of v-shaped grooves may be formed on a top surface of the pin bundle to form a microstructure surface featuring a predetermined shape. One or two diamond cutting tool(s) may be configured with desired tool angles to shape the top surface of the pin bundle. The predetermined shape may include three orthogonal, smooth and reflective surfaces. The predetermined shape may be full cube corners, where the three tool angles have an equal value. The pitches of three sets of grooves may be larger than the dimensions of pins.

The apparatus may further comprise a second mechanical fixture configured to stack a sub-set of the plurality of shaped pins, each shaped pin comprising a same predetermined cube corner shape, to form a sub-set pin bundle.

The apparatus may also comprise an electroforming unit configured to electroform the sub-set bundle to provide the mold.

The diamond cutting tool may be further configured to make cuts along three axes of the top surface of the pin bundle, each of the three axes having a different direction and an associated tool angle, which may be different or may be the same for at least two of the cuts. Multiple diamond cutting tools may be employed to make cuts on the top surface of the pin bundle.

Two or three cutting patterns may be applied to a desired pin bundle. Each cutting pattern may include associated values for three sets of pitch, base angle between any two sets of cuts, and tool angles. Each cutting pattern may be made in a distinct orientation.

In an example embodiment, the pins stacked in the pin bundle may have a hexagonal cross section. The diamond turning cutting may provide three sets of v-shaped grooves formed on the pin bundle surface so that a subset pin bundle comprise cube corners, each one may have a hexagonal aperture. The cube corner may include three orthogonal facets, each facet including a polygon boundary of equal value. The polygon boundary may be a square, rectangle, or pentagon. The pitches of the three sets of grooves may be larger than the dimensions of the pins. The value of the pitch of the three cuts may be equal.

The pins in the pin bundle may also have a rectangular cross section and aperture. The rectangular aperture may include first and second facets including a trapezoid boundary of equal value and a third facet having a symmetrical polygon boundary.

The In another example embodiment, the pins stacked in the pin bundle may have a circular cross section and aperture. The circular aperture may include three facets with a same circle sector boundary including a 90° center angle. The pins in the pin bundle may also have an irregular hexagonal or elliptical cross section. It should be appreciated that these are merely examples and a diameter of any size may be employed.

The diamond turning cutting may provide three sets of v-shaped grooves formed on the pin bundle surface so that a subset pin bundle comprise cube corners. Each cube corner may have a circular aperture and three orthogonal facets, each facet including a circle sector shape with a 90° center angle. The pitches of the three sets of grooves may be larger than the diameter of the pins. The value of the pitch of the three cuts may be equal.

In another example embodiment, the pins stacked in the bundle may have a rectangular cross section. The diamond turning cutting may provide three sets of v-shaped grooves formed on the pin bundle surface so that a subset pin bundle comprise cube corners. Each cube corner may have a rectangular aperture and three orthogonal facets. Two facets may include the same trapezoid boundary and the third facet may have a symmetric polygon shape including an isosceles triangle and a rectangle. The symmetric polygon boundary may also be an isosceles triangle. The pitches of the three sets of grooves may be larger than the longer dimension of the rectangle of the pins. At least two of three pitches are not equal.

The pins in the pin bundle may also have an irregular hexagonal or elliptical cross section. The circular pins may have a diameter on the order of microns from 10 microns to 5000 microns. The dimension of the hexagonal pin and rectangular pin may include values of 10 microns to 5000 microns. It should be appreciated that these are merely examples and a diameter of any size may be employed. The pins may be formed of a material such as polyethylene, teraphthalate, polymethyl methacrylate, polycarbonate, brass, nickel, copper, or aluminum.

BRIEF DESCRIPTION OF THE DRAWINGS

The foregoing will be apparent from the following more particular description of example embodiments of the invention, as illustrated in the accompanying drawings in which like reference characters refer to the same parts throughout the different views, or where different reference numbers may also be used to refer to the same parts. The drawings are not necessarily to scale, emphasis instead being placed upon illustrating example embodiments.

FIGS. 6A, 6B, and 6C are top, side, and three dimensional perspective, respectively, views of the first step of the cutting scheme shown in FIG. 3;

FIGS. 7A, 7B, 7C, and 7D are top, side, three dimensional perspective, and zoomed-in window, respectively, views of the second step of the cutting scheme shown in FIG. 3;

FIGS. 8A, 8B, 8C, and 8D are top, side, three dimensional perspective, and zoomed-in window, respectively, views of the third step of the cutting scheme shown in FIG. 3;

FIGS. 11A-11C illustrate a top view and side views, respectively, of a pin bundle featuring circular cross sectional pins having undergone the cutting scheme shown in FIG. 3;

FIGS. 12A-12C illustrate an overview of a cutting scheme used with rectangular pins of different dimensions and cutting specifications;

FIGS. 15A-15C illustrate a side view along the y axis of the pin bundle shown in FIGS. 14A-14C, respectively;

FIGS. 16A-16C illustrate a side view along the x axis of the pin bundle shown in FIGS. 14A-14C, respectively;

DETAILED DESCRIPTION

A description of example embodiments follows.

FIGS. 2-9 illustrate example embodiments for providing mass-producible hexagonal pins that may be used to provide a mold including a plurality of full cube corner corners. The mold may be used to form a retroreflective article with an optimal angle of entrance in the range of 0°-30°.

Figure 2C:
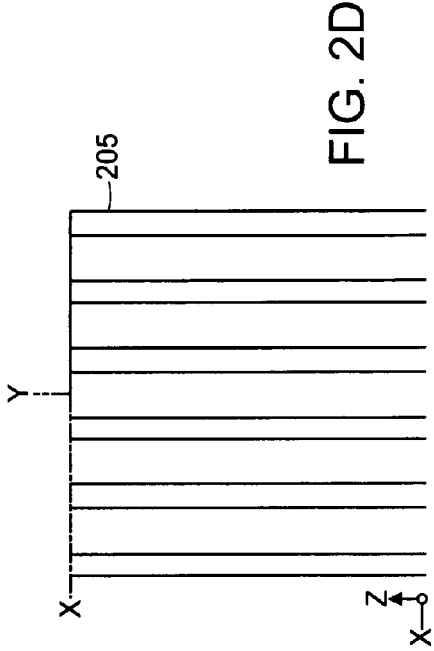
FIGS. 2A-2D are schematics of a hexagonal pin and corresponding pin bundle according to example embodiments.
Figure 2D:
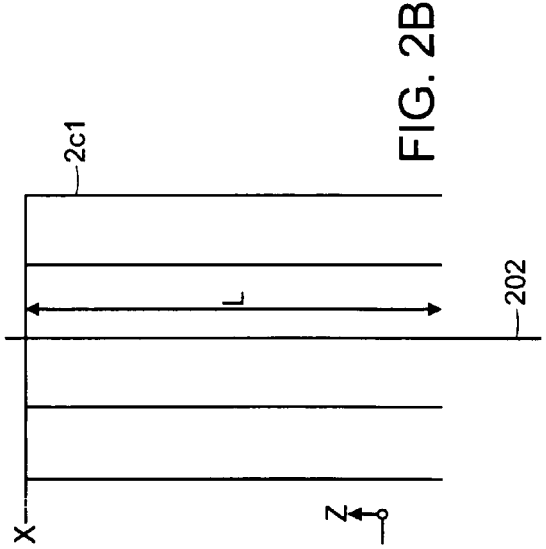
Figure 2A:
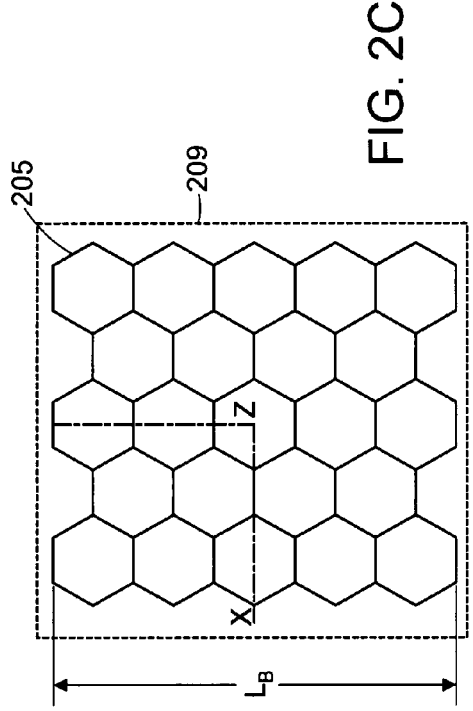
Figure 2B:
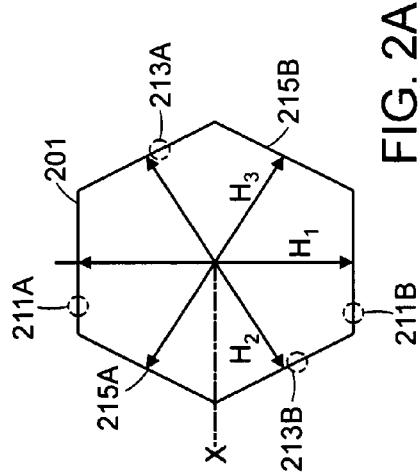

FIGS. 2A-2D are of top and side views of a hexagonal pin 201 and a hexagonal pin bundle 205, respectively. Each hexagonal pin includes a hexagonal cross section and a hexagonal aperture. In the illustrated example, the hexagonal pin 201 features a cross sectional height H of 0.010 inches along the vertical or z-axis, and a length L of 1 inch. A reference axis 202 depicted in FIG. 2B is parallel to all six side surfaces of the hexagonal pin, and is also through the center point of the hexagon shown in FIG. 2A.

The hexagon cross section includes three pairs of parallel sides. One parallel side pair 211A and 211B is positioned in a horizontal direction and the pair are separated by a cross sectional height of $H_1$. The second pair of parallel sides, 213A-213B and the third pair of parallel sides 215A-215B, are oriented 30° right and 30° left, respectively, of the first horizontal parallel pair. The distance between second parallel side pair is defined by $H_2$, while the distance between the third parallel side pair is defined by $H_3$. In the present example, $H_1=H_2=H_3=H$, where H is also known as the in-diameter of the hexagon.

It should be appreciated that this is merely an example and that the hexagonal pin 201 may take on any dimensions that depend on the desired size for the resulting cube corner articles. For example the hexagonal height H and length L may be on the order of microns, (e.g., 20 to 5,000 microns).

The hexagonal pins may be organized in honeycomb fashion to provide a pin bundle 205, as shown in FIGS. 2C and 2D. In an example embodiment, the length of a pin bundle LB may be 0.1×0.1 inches, or ⅛×⅛ to ¼×¼ of an inch, although it should be appreciated that pin bundles of any dimension may be employed. The individual pins in the pin bundle 205 shown in FIGS. 2C and 2D are approximately of identical height H and length L, although it should again be appreciated pins of any and different dimensions may be used to form the pin bundle.

The pin bundle 205 may be formed by stacking the pins 201 with a fixture 209 configured to provide a flat surface on both ends of the stacked pin bundle. The fixture 209 may be a specially designed fixture for holding the pins in place, which may ensure that all of the reference axis of the pins are parallel in the order of 0.1 to 1 arc minutes. The fixture 209 may also be in the form of a mechanical clamp or any other fixture known in the art for holding a pin or pin bundle, for example, on a flat stage of a fly cutting machine or any other type of milling machine. It should also be appreciated that the top surface of the pin bundle may be cut or machined in order to provide a flat and leveled surface as an initial step. The top and bottom surfaces of the pin bundle may be made to be perpendicular to the reference axis of the pin bundle at a tolerance of 1 arc minute. The reference axis may also be used as the normal line of the top surface of the pin bundle.

Figure 3A:
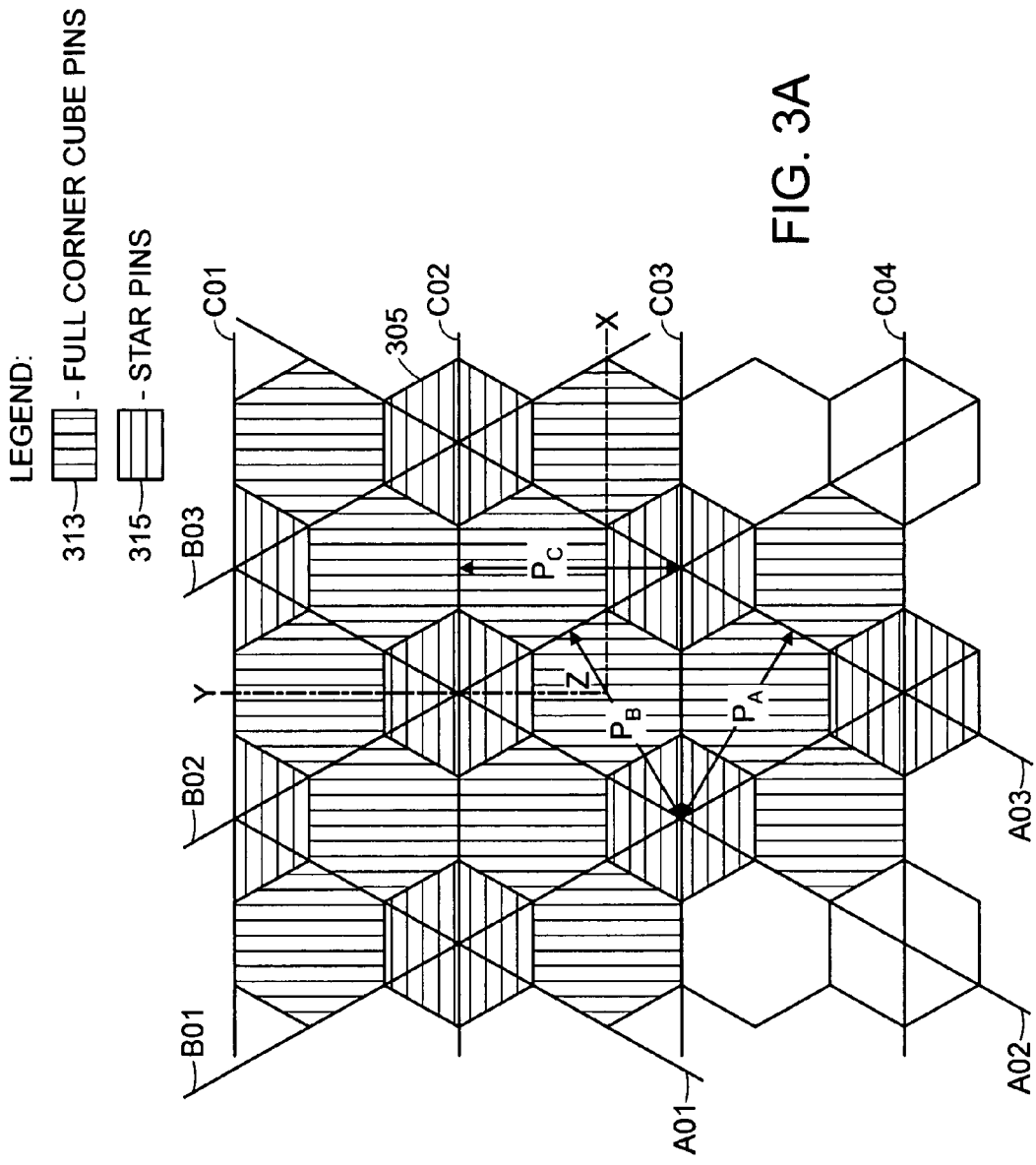
FIGS. 3A and 3B are schematics of an overview of the cutting scheme and a cutting tool tip used in the same.

FIG. 3A provides an illustrative overview of a cutting scheme that may be employed in providing a microstructure surface featuring full cube corners, in an example embodiment. In the example shown in FIG. 3A, a number of cuts, illustrated as bold lines, may be made in three directions ('A,' 'B,' and 'C'). As shown, three cuts A01, A02, and A03 may be made in a first diagonal direction 'A.' In the present example, the 'A' cut is parallel to the sides 215A and 215B of the example pin of FIG. 2A. Three cuts B01, B02, and B03 may be made in a second diagonal direction 'B.' In the present example, the 'B' cut is parallel to the sides 213A and 213B of the illustrated in FIG. 2A. Four cuts C01, C02, C03, and C04 may also be made in a horizontal direction 'C.' The 'C' cuts are parallel to the sides 211A and 211B of the pin shown in FIG. 2A. It should be appreciated that any number of cuts may be used in each of the three directions.

The pitch $P_A$ defines the distance between two consecutive 'A' cuts, the pitch $P_B$ defines the distance of two consecutive 'B' cuts, and the pitch $P_C$ defines the distance of two consecutive 'C' cuts. In an example embodiment, the pitches $P_A$, $P_B$, and $P_C$ associated with the 'A,' 'B,' and 'C' cuts, respectively, may all have an equal value of approximately three halves times the hexagonal height (3/2)H. It should be appreciated that other cutting pitches may be employed. It should further be appreciated that the pitch values for the 'A,' 'B,' and 'C' cuts need not be equal.

In another example embodiment, a cutting pitch of $$\frac{3}{\sqrt{3}}H$$

may be employed.

Figure 3B:
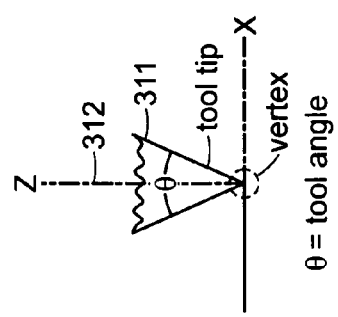

In yet another example embodiment, a diamond turning tool may be used to machine the top surface of the hexagonal pin bundle 305 in order to provide the 'A,' 'B,' and 'C' cuts. FIG. 3B illustrates a tool tip 311 of one diamond turning tool that may be moved and rotated above the pin bundle 305 in order to perform the 'A,' 'B,' and 'C' cuts. Alternatively, the pin bundle 305 may be moved and rotated beneath the diamond turning tool, or a combination of moving both the pin bundle 305 and the diamond turning tool may be employed. The cuts provided by the tool tip 311 of one diamond turning tool may be in the form of v-shaped grooves, with the vertex of the tool tip 311 defining the tip of the v-shaped groove and the sides of the tool tip 311 defining the side walls of the v-shaped groove.

The tool tip 311 may present a tool angle θ and a central axis 313 (e.g., the optical axis of the cube corner) that is perpendicular to the top surface of the pin bundle 305. To obtain a full cube corner using regular hexagonal pins, the tool angle θ for the 'A,' 'B,' and 'C' cuts may be of equal value. In an example embodiment, the tilt angle θ may comprise a value of 70.53°. The central axis 312 of the tool may be perpendicular to the top surface of the bundle 305. After the cutting process, one cube corner may comprise a negative tilt angle on one facet if the central axis 312 inclines from the normal line of the pin bundle surface and away from the facet. Conversely, an opposite cube corner may comprise a positive tilt angle on one facet if the tool central axis inclines from the normal line of the pin bundle surface and towards the facet. It should be appreciated that any angle values may be employed in the example embodiments. For example, if $H_1$ is 90% of $H_2$ and $H_2=H_3$, there may be a need for different tool angle values for the 'C' and the 'A' and 'B' cuts, which may result in $\theta=83.85°$ and $\theta=63.49°$, respectively.

The hexagonal pins that are defined in the triangles formed by three sets of parallel cuts 'A', 'B', and 'C' are marked with a vertical line shading in their respective hexagon cross sections as shown in FIG. 3A. The hexagonal pins that are located in the intersection of the three parallel cuts 'A', 'B', and 'C' are marked with horizontal line shading in their respective hexagon cross sections. In the present example, the number of hexagon pins with vertical shading is ⅔ of the total amount of stacked pins in the pin bundle 305, while the number of hexagon pins with horizontal shading is ⅓ of the total number of stacked pins in the bundle 305. The hexagon pins 315 with vertical line shading may include a full cube corner shape on their respective top surface after under going the cutting process described above. The hexagon pins 313 with horizontal line shading may include a complex multi-faceted "inverted star" shape on their respective top surface. It should be noted that the pins including an "inverted star" top surface shape may not have retro-reflectivity.

Figure 4B:
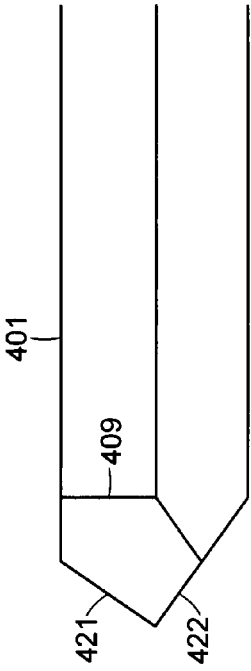
FIGS. 4A, 4B, and 4C illustrate a top view and side views, respectively, of a pin including a full cube corner configuration obtained via the cutting scheme shown in FIG. 3.
Figure 4A:
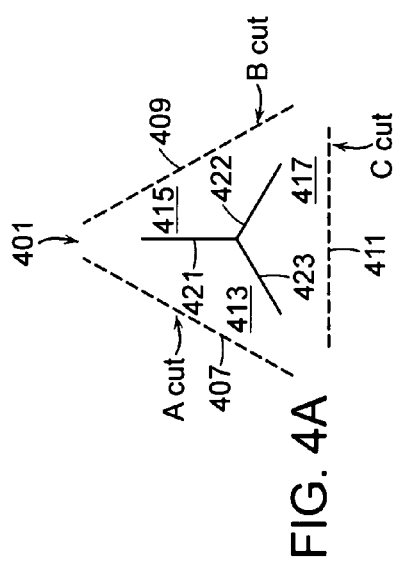
Figure 4C:
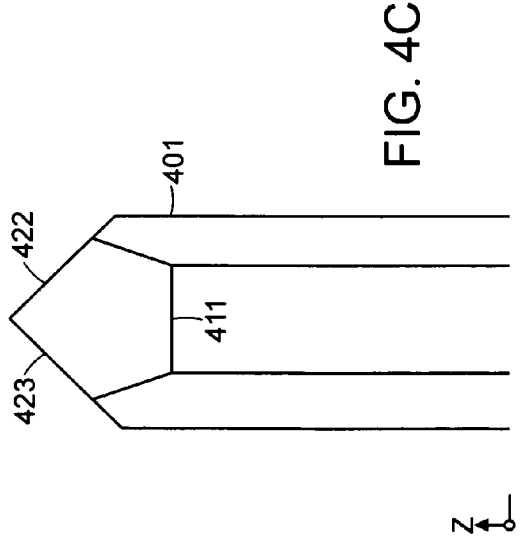

FIGS. 4A-4C illustrate a top, side, and front view, respectively, of a pin 401 comprising a full cube corner top surface shaping of FIG. 3A. The deepest point of the v-shaped grooves, defined by the vertex of the tool tip, provided by the 'A,' 'B,' and 'C' cuts are labeled as 407, 409, and 411, respectively, in FIG. 4A. The deepest point of the v-shaped grooves 407, 409, and 411 define the outer edges of the full cube corner.

The sides of the tool tip may also define the v-shaped groove side walls 413, 415, and 417, which are also the facets of the full corner cube configuration formed by the 'A,' 'B,' and 'C' cuts, respectively. The facets 413 and 415 may define an edge 421 and a dihedral angle between the two facets. The facets 415 and 417 may define and edge 422 and a second dihedral angle. Similarly, the facets 417 and 413 may define an edge 423 and may also define a third dihedral angle. The three facets 413, 415, and 417 may be orthogonal to one another and the three dihedral angles may be 90° angles.

The three facets 413, 415, and 417 of the full cube corner are in the shape of a polygon, specifically a pentagon as illustrated in FIGS. 4A and 4C. It should be appreciated that cutting schemes featuring different cutting parameters may provide facets of different shapes, for example a full cube corner pin featuring a hexagonal aperture may include rectangular facets.

Figure 5B:
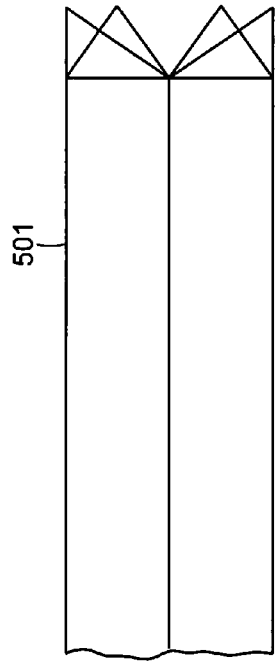
FIGS. 5A, 5B, and 5C illustrate a top view and side views, respectively, of a pin including a star configuration obtained via the cutting scheme shown in FIG. 3.
Figure 5A:
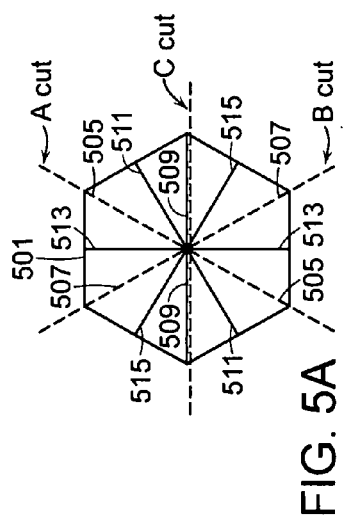
Figure 5C:
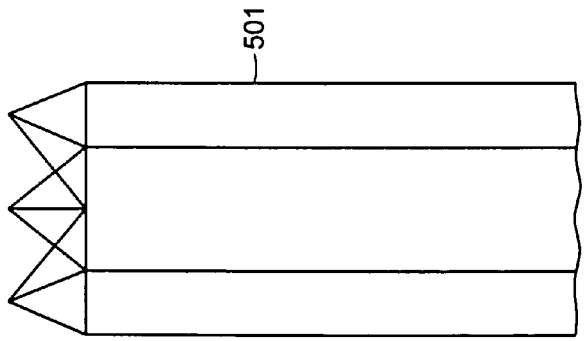

FIGS. 5A-5C provide a top, side, and front view, respectively, of a pin 501 comprising a star top surface shape of FIG. 3A. Note that the pin illustrated in FIGS. 5A-5C is not retro-reflective. The deepest point of the v-shaped grooves defined by the tool tip providing the 'A,' 'B,' and 'C' cuts, are labeled as 505, 507, and 509, respectively. The sides of the tool tip 313 may define the side walls of the v-shaped grooves 511, 513, and 515 formed by the 'A,' 'B,' and 'C' cuts, respectively, in the star configuration.

FIGS. 6-8 provide a step-by-step illustration of the example cutting scheme described above in relation to FIG. 3A. FIGS. 6A-6C provide a top, side, and three dimensional perspective view, respectively, of a first set of cuts made in the horizontal 'C' direction on the pin bundle 605. As shown, four horizontal 'C' cuts, C01, C02, C03, and C04 are made with a pitch of $P_C$. The deepest point of the v-shaped grooves, made by the vertex of the tool tip 311, of the 'C' cuts C01-C04 are labeled as darkened lines in FIGS. 6A and 6C. The deepest point of the v-shaped groove of each 'C' cut may be made at a depth $D_C$. In an example embodiment, each 'C' cut C01-C04 comprises an equal depth $D_C$ which may be 7.07 mm, in another example embodiment a cutting depth of 8.17 mm may be used. It should be appreciated that other depth values may be employed. It should further be appreciated that the depth value of each 'C' cut need not be equal.

Each 'C' cut defines two side walls, with the exception of 'C' cut C01, which only defines one side wall, since cut C01 is made at an edge of the pin bundle. As an illustrative example, the side walls of the v-shaped groove C04, made by the sides of the tool tip 311, have been labeled as 625 and 627.

FIGS. 7A-7C provide a top, side, and three dimensional perspective view, respectively, of the second cut made on the pin bundle 705, which is a set of diagonal cuts in the 'B' direction. As shown, four diagonal 'B' cuts, B01, B02, B03, and B04 are made, each cut comprising a pitch of $P_B$. Prior to making the second set of cuts, in the 'B' direction, the pin bundle 705 is rotated 60° counterclockwise. Thus the direction of the 'B' cut is in the horizontal direction. The deep most points of the v-shaped grooves created by the vertex of the tool tip during each 'B' cut are marked as B01, B02, B03, and B04. The four diagonal 'B' cuts, B01-B04 may be made with a pitch of $P_B$. In an example embodiment, each 'B' cut B01-B04 may comprise a depth $D_B$ equal to the depth $D_C$ associated with the 'C' cuts. It should be appreciated that any depth value may be employed. It should further be appreciated that other depth values of each 'B' cut need not be equal and that the depth value of the 'B' cuts and 'C' cuts need not be equal.

Similarly to the 'C' cuts, each 'B' cut may define two side walls or two facets, e.g., the side walls of each v-shaped groove as made by the sides of the tool tip 311. As an illustrative example, the side walls of the B04 cut are labeled as 729 and 731. The v-shaped grooves created by the 'B' cuts B01-B04 may intersect the v-shaped grooves created by the 'C' cuts C01-C04. The intersection of two v-shaped grooves is illustrated by the zoomed-in view provided by window 735 (FIG. 7D). Upon making the cut B04, the side walls 729 and 731 created by the cut B04 intersect with the sidewalls 625 and 627 created by the cut C04 at a point 740. The point 740 is a center of a pin which will have a star configuration on its top surface upon completing the cuts in the 'A,' 'B,' and 'C' directions.

FIGS. 8A-8C provide a top, side, and three dimensional perspective view, respectively, of the pin bundle 805, after the second set of diagonal cuts. Prior to making the third set of cuts, in the 'A' direction, the pin bundle 805 is rotated 60° clockwise. As shown, four diagonal 'A' cuts, A01, A02, A03, and A04 are made, each cut comprising a pitch of $P_A$. The deep most point of the v-shaped groove, made by the vertex of the tool tip 311, of the 'A' cuts A01-A04 are labeled as darkened lines in FIGS. 8A and 8C. The deep most point of the v-shaped groove of each 'A' cut may be made at a depth $D_A$. In an example embodiment, each 'A' cut A01-A04 may comprise a depth $D_A$ equal to the depths $D_B$ and $D_C$ associated with the 'B' and 'C' cuts, respectively. It should be appreciated that other depth values may be employed. It should further be appreciated that the depth value of each 'A' cut need not be equal and that the depth value of the 'A,' 'B,' and 'C' cuts need not be equal.

Similarly to the 'B' and 'C' cuts, each 'A' cut may define two side walls or two facets of each v-shaped groove, may be formed by the sides of the tool tip 311. As an illustrative example, the side walls produced by cuts A01 and A02 are labeled as 817, 819, and 821, 823, respectively, as shown in the window 835 (FIG. 8D). At the center of each pin comprising a star top surface configuration, the v-shaped grooves created by the 'A' cuts A01-A04 may intersect the v-shaped grooves created by the 'B' cuts, B01-B04, and the v-shaped grooves created by the 'C' cuts C01-C04. At the center of the triangle formed by individual 'A,' 'B,' and 'C' cuts, a pin including a full cube corner top surface configuration is formed. The pins which comprise a full cube corner top surface have been shaded in FIGS. 8A and 8C. As shown, approximately two thirds of the pins in the pin bundle 805 may include full cube corners upon implementing the cuts in the 'A,' 'B,' and 'C' directions.

The intersection of v-shaped grooves and the triangles created by the intersection of the 'A,' 'B,' and 'C' cuts are illustrated by the zoomed-in view provided by window 835. The side walls of the cut C04 are labeled as 625 and 627, the side walls of the cut B02 are labeled as 721 and 723, the side walls of the cut A01 are labeled as 829 and 831, and the side walls of the cut A02 are labeled as 821 and 823. In the formation of the star pin, located in the lower right-hand side of the window 835, upon making the cut A01, the side walls 625 and 627, created by the 'C' cut C04, and side walls 721 and 723, created by the cut B02, are intersected at a point 840. The point 840 is a center of the star pin located in the lower right-hand side of window 835. Also found in the center of the star pin is a lower right-hand side vertex of the triangle formed by the A02, B02, and C04 cuts.

In the center of the formed triangle is a pin comprising a full cube corner top surface configuration, which has been shaded. The full cube corner top surface configuration is defined by side walls, or facets, 821, of the A02 cut, 723, of the B02 cut, and 625, of the C04 cut. The A02, B02 and C04 cuts also define an apex of the full cube corner 850.

As shown in window 835, three edges 851, 852, and 853 define the side walls 821, 723, and 625 of the A02, B02, and C04 cuts, respectively. The three dihedral angles, also labeled as 851, 852, and 853, are defined by facet pairs 821-723, 723-625, and 625-821, respectively. The three facets 821, 723, and 625 are orthogonal with respect to one another and the three dihedral angles are right angles with a value of 90°. The three edges 851, 852, and 853 are also orthogonal with respect to each other and with respect to the facets 625, 821, and 723 respectively. In the illustrated example, each facet of the full cube corner of the hexagon pin has a pentagon shape.

It should be appreciated that different depth values may be employed for three cuts 'A,' 'B,' and 'C' cuts resulting in the apex of the cube corner deviating from the center of the hexagonal pin. For example, a deeper 'C' cut (e.g., $D_C$ is larger than $D_A$ and $D_B$) would resulting in the apex 850 deviating from the pin center and away from the outer edge of the facet 625 created by the 'C' cut.

Figure 9B:
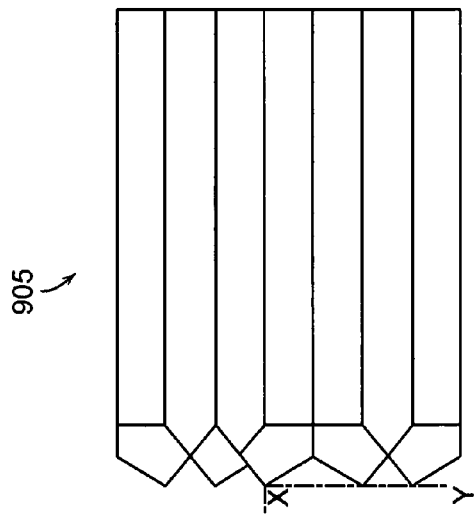
FIGS. 9A, 9B, and 9C are top, side, and three dimensional perspective, respectively, views of a pin bundle featuring pins with a full cube corner configuration obtained using the cutting scheme shown in FIG. 3.
Figure 9C:
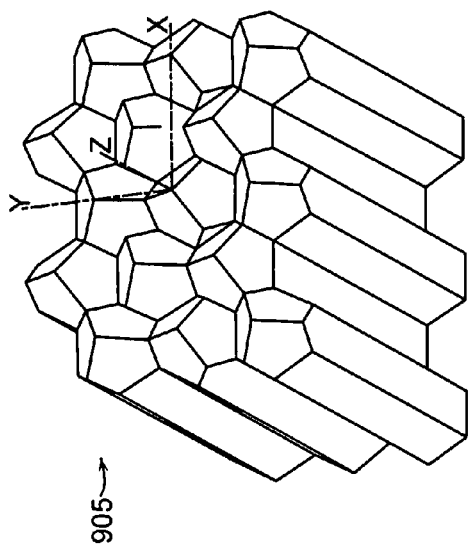
Figure 9A:
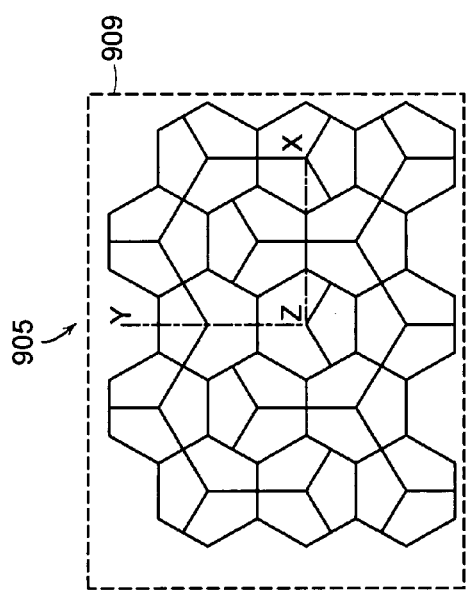

After implementing the cuts in the 'A,' 'B,' and 'C' directions, the hexagonal pins including the full cube corner top surfaces may then be re-bundled. FIGS. 9A-9C provide a top, side, and three dimensional perspective view, respectively, of the re-bundled pins 905 featuring the full cube corners. The re-bundled pins 905 may be stacked by a fixture 909. The fixture 909 may be a specially designed fixture for holding the pins in place. The fixture 909 may also be in the form of a mechanical clamp or any other fixture known in the art for holding a pin or pin bundle. The re-bundled pins 905 may thereafter be used to form a mold. The mold may be electroformed to produce an number of sub-set molds. A larger mold may be produced by forming a parquet of the sub-set molds. The retroreflective material may be produced via casting and/or an embossing process.

Figure 10B:
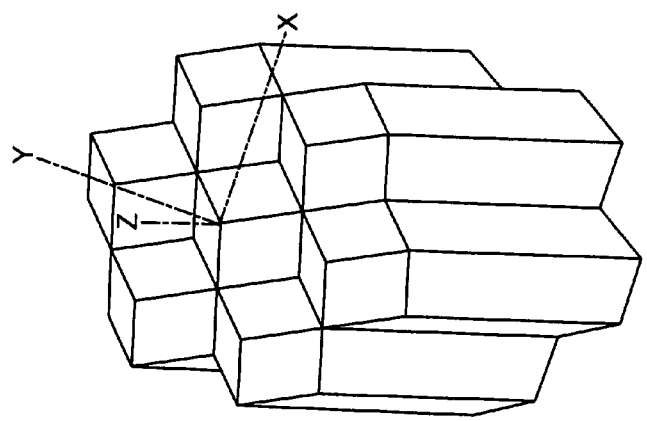
FIGS. 10A and 10B illustrate three dimensional perspective views of a pin bundle and sub-pin bundle, respectively, featuring cube corners with square facets.
Figure 10A:
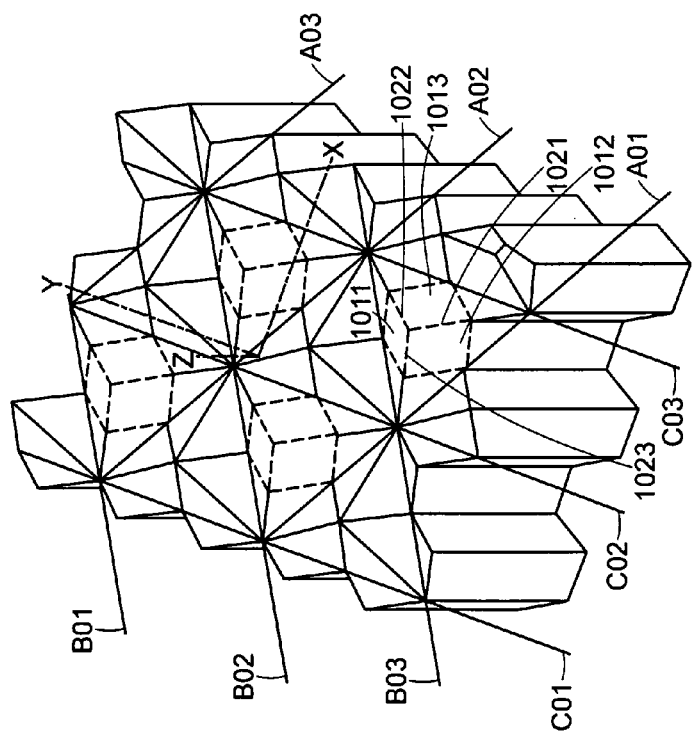

FIGS. 10A-10C illustrate another example cutting scheme that may be employed using the same hexagonal pin bundle shown in FIGS. 2A-2D. The cutting pattern illustrated in FIG. 10A also includes three sets of cuts: an 'A' cut including cuts A01, A02, and A03; a 'B' cut including cuts B01, B02, and B03; and a 'C' cut including cuts C01, C02, and C03. The cut C01 passes through all the left end points of the first pair of parallel side of hexagonal pins in the first column of the pin bundle as shown in FIG. 10A. The cut C02 passes through all the left end points of the first pair of parallel side of hexagonal pins in the third column of the pin bundle. The cut C03 passes through all the left end points of the first pair of parallel side of hexagonal pins in the fifth column of the pin bundle. In the example embodiment, the 'C' cut has a pitch which is equal to $$\frac{3}{\sqrt{3}}H,$$

where H is the in-diameter of the hexagon. The diamond tool for each 'C' cut may include a tool angle of 70.53°. The 'C' cuts produce v-shaped grooves, where the deepest points of the grooves are also labeled as C01, C02, and C03. The v-shaped groves C01, C02, and C03 may all comprise an equal depth of $$\frac{\sqrt{2}}{\sqrt{3}}H.$$

It should be appreciated that the depth of each 'C' cut may not be the same.

As shown in FIG. 10A, the cut A01 passes through the left end point of the bottom side of the first pair of parallel sides of the third hexagon pin in the first column of the pin bundle from the left. The cut A01 also passes through the left end point of the bottom side of the first pair of parallel sides of the fifth hexagon pin in the fifth column of the pin bundle. The cut A02 passes through the left end point of the top side of the first pair of parallel sides of the first hexagon pin in the first column of the pin bundle. The cut A02 also passes through the left end point of the bottom side of the first pair of parallel sides of the third hexagon pin in the fifth column of the pin bundle. The cut A03 passes through the left end point of the top side of the first pair of parallel sides of the first hexagon pin in the third column of the pin bundle. The cut A03 also passes through the left end point of the top side of the first pair of parallel sides of the second hexagon pin in the fifth column of the pin bundle.

The cuts B01, B02, and B03 are made by connecting the intersect points of 'C' cuts and 'A' cuts. In the example embodiment, both the 'A' cut and the 'B' cut have the same pitch of $$\frac{3}{\sqrt{3}}H,$$

or 0.01732 inches for a regular hexagon cross section of pins. The v-shaped groves of the 'A' cut and the 'B' cut may also include the same depth of $$\frac{\sqrt{2}}{\sqrt{3}}H$$

as the grooves provided by the 'C' cuts. It should be appreciated that the depth of 'A,' 'B,' and 'C' grooves may be of equal or unequal values.

FIG. 10B illustrates a re-assembled pin bundle featuring the pins of FIG. 10A including full cube corner top surfaces. The created full cube corner may include three orthogonal facets. Each facet may include a square boundary resulting from using equal cutting depths for the 'A,' 'B,' and 'C' cuts. It should be noted that this is a contrast to the facets including pentagon boundaries, as illustrated in FIG. 9, generated by the previous cutting pattern.

It should be appreciated that the pins may be manufactured to comprise any shape of cross section or aperture. For example, the pins may be manufactured to comprise a circular cross section and circular aperture. FIGS. 11A-11C provide a top, and side views, respectively, of a pin bundle 1005 featuring circular pins having under gone a cutting process. In this example, the pins may feature a length of 1 inch and a diameter of D=0.008 inches. The cutting scheme illustrated in FIGS. 11A-11C also includes the sets of cuts 'A,' 'B,' and 'C' labeled as A01-A03, B01-B03, and C01-C03, respectively. In the example embodiment, the diamond tool tip may be configured to include a tool angle of 70.53° for the 'A,' 'B,' and 'C' cuts. The pitches for 'A,' 'B,' an 'C' cuts may have an equal value of $$\frac{3}{2}D,$$

or 0.012 inches. The three sets of v-shaped grooves created by the 'A,' 'B,' and 'C' cuts may have an equal depth of $$\frac{D}{\sqrt{2}},$$

or 0.008485 inches.

The intersection of the three sets of cuts, 'A,' 'B,' and 'C' may be defined by a 60° angle formed between any of two individual 'A,' 'B,' or 'C' cuts. In the triangles formed by the intersects of the individual 'A,' 'B,' and 'C' cuts, a pin including a full cube corner on its top surface may be formed. The pins including a star top surface configuration are located around the vertices of the triangle intersections. Each pin including a full cube corner may further include the three facets in the shape of a circular sector with a 90° center angle. It should be appreciated that a different cut depth may be applied to at least one of three 'A,' 'B,' or 'C' cuts, which may result in the apex of the full cube corner created on the circular pin top to be deviated from the center of the circle cross section of the pin.

FIG. 12 to FIG. 18 show other example embodiments, in which pin bundles formed with pins including rectangular cross sections may be utilized. The rectangular pins in the bundle may also be cut to comprise rectangular cube corners on their top surface by a specified cutting scheme.

FIGS. 12A-12C provide three examples of cutting patterns which may be utilized to provide a subset of rectangular cross sectional pins featuring a full corner cube top surface. Each pin bundle shown in FIGS. 12A-12C may include a 3×7 array of rectangular pins as an example. The rectangular pins in each 3×7 bundle may featuring the same cross sectional horizontal length (e.g., 12 inches) but may include different cross sectional vertical lengths (e.g., 6, 7, and 8 inches as shown in FIGS. 12A-12C, respectively). It should be appreciated that pins of any dimensional may be utilized.

Similarly to the previous examples, the cutting scheme includes diamond tools and a cutting pattern comprising three sets of parallel cuts, labeled as 'A,' 'B,' and 'C.' Each set of cuts may be made in a distinct direction, where two base angles may describe the angles formed between any two sets of 'A,' 'B,' or 'C' cuts. Two diamond tools comprising different tool angles may be used to implement the three cuts 'A,' 'B,' and 'C' although it should be appreciated that any number of diamond tools may b used.

The cutting schemes of FIG. 12A-12C illustrates the 'C' cut as lines drawn passing through the centers of each rectangular pin and running parallel to the vertical length of the cross sections. The 'A' cuts are illustrated as lines passing through the centers of the rectangular cross sections of a subset of pins and parallel to the diagonal of the rectangle cross section of the pins from the left bottom corner to the right top corner. The 'B' cuts are illustrated as lines passing through the centers of the rectangular cross sections of a subset of pins and running parallel to the diagonal of the rectangle cross section of the pins from the left up corner to the right bottom corner.

In a diamond intersection formed by one 'C' cut in vertical, two consecutive 'A' cuts, and two consecutive 'B' cuts nearby, one rectangular pin featuring two full corner cubes may be found, where each full corner cube may be found in a triangular intersection (e.g., half of the diamond intersection). The pins featuring the two full corner cubes are highlighted in each pin bundle.

In FIG. 12A, the rectangular pins have a cross-section dimension of 0.012"×0.006" inches, where the horizontal length of the cross section is 0.012" and the vertical length of the cross section is 0.006". In the example illustrated in FIG. 12A, the 'C' cuts C01-C03 may be provided with a diamond tool including a tool angle of 60°, while the 'A' and 'B' cuts A01-A04 and B01-B04, respectively, may be implemented with another diamond tool having tool angle of 75.52°. The 'C' cuts C01-C03 were implemented at pitch of 0.012 inches, while the 'A' and 'B' cuts A01-A04 and B01-B04, respectively, were implemented at pitch of 0.010733 inches. The depth of the 'A,' 'B,' and 'C' cuts were all implemented at 0.0052 inches. As shown in FIG. 12A, a pin with a rectangular cross section of 0.012"×0.006" inches has a pair of full cube corners shaped on its top surface. Each cube corner has a square aperture of 0.006"×0.006" inches.

In FIG. 12B, the rectangular pins have a cross section of dimension 0.012×0.007" inches, where the horizontal length of the cross section is 0.012" and the vertical length of the cross section is 0.007". In the example provided by FIG. 12B, the 'C' cuts C01-C03 may be provided with a diamond tool comprising a tool angle of 71.37°, while the 'A' and 'B' cuts A01-A04 and B01-B04, respectively, may be implemented with a diamond tool comprising a tool angle of 70.11°. The 'C' cuts C01-C03 were implemented at pitch of 0.012 inches as the same as shown in FIG. 12A, while the 'A' and 'B' cuts A01-A04 and B01-B04, respectively, were implemented at pitch of 0.0120929 inches. The depth of the 'C' cut was implemented at 0.0042 inches, while the depth of the 'A' and 'B' cuts were implemented at 0.0065 inches. As shown in FIG. 12B, a pin with a rectangular cross section of 0.012"×

0.007" inches has a pair of full cube corners shaped on its top surface. Each cube corner has a rectangular aperture of 0.006"×0.007" inches.

In FIG. 12C, the rectangular pins have a dimension of 0.012×0.008 inches, where the horizontal length of the cross section is 0.012" and the vertical length of the cross section is 0.008". In the example provided by FIG. 12C, the 'C' cuts C01-C03 may be implemented with a diamond tool including a tool angle of 83.62°, while the 'A' and 'B' cuts A01-A04 and B01-B04, respectively, may be implemented with a diamond tool of including a tool angle of 63.61°. The 'C' cuts C01-C03 may be implemented at pitch of 0.012 inches similar to the cutting schemes illustrated in FIGS. 12A and 12B, while the 'A' and 'B' cuts A01-A04 and B01-B04, respectively, may be implemented at pitch of 0.0133128 inches. The depth of the 'C' cut may be implemented at 0.0034 inches, while the depth of the 'A' and 'B' cuts may be implemented at 0.0080 inches. As shown in FIG. 12C, a pin with a rectangular cross section of 0.012"×0.008" inches has a pair of full cube corners shaped on its top surface. Each full cube corner has a rectangular aperture of 0.006"×0.008" inches.

Figure 13C:
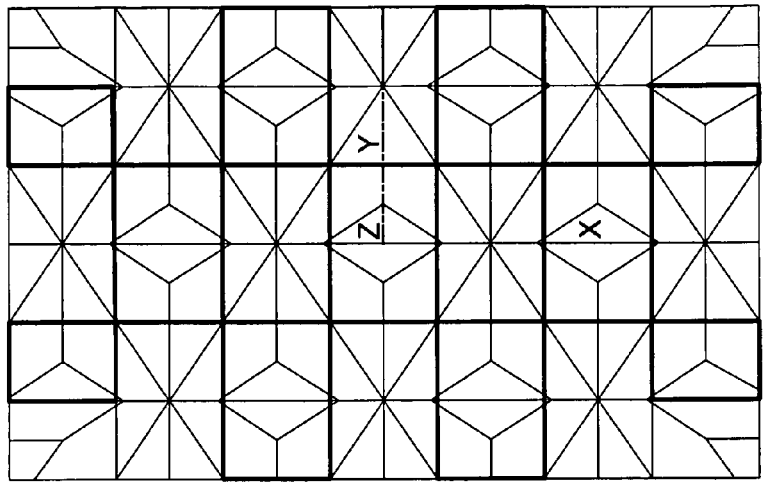
FIGS. 13A-13C illustrate the resultant pin bundle upon undergoing the cutting scheme of FIGS. 12A-12C respectively.
Figure 13B:
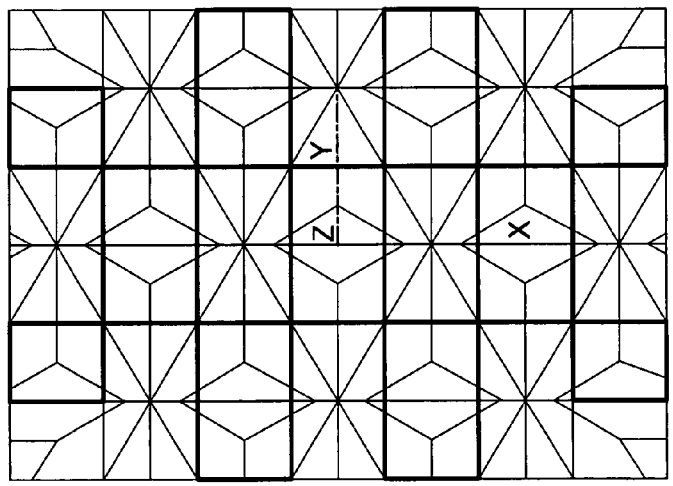
Figure 13A:
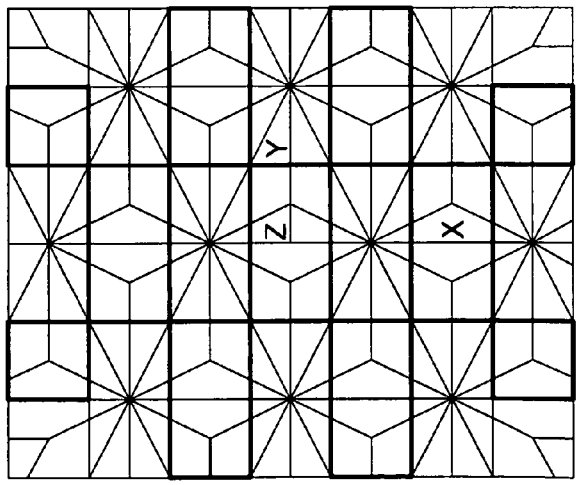

FIGS. 13A-13C illustrate the resultant pin bundle obtained by implementing the cutting schemes illustrated in FIGS. 12A-12C, respectively, where the pins including two rectangular full cube corners top surfaces are shaded. As shown in FIGS. 13A-13C, the cutting schemes illustrated in FIGS. 12A-12C yield the same percentage of rectangular pins featuring two full cube corners. Specifically, of the 3×7, or 21 pins, in each pin bundle, approximately one half of the rectangular pins includes a pair of full cube corners. For example, in the third and fourth rows of the 3×7 pin array counted from the top as shown in FIG. 13A there are three rectangular pins including a pair of full cube corners, two in the third row and one in the fourth row.

The facets of the rectangular full cube corners of FIGS. 13A-13C include two identical sides featuring a trapezoidal shape. The third facet features a polygon shape with a triangle on the top and a rectangle at bottom. Another feature of the rectangular full cube corners shown in FIGS. 13A-13C is the apex position of the cube corner. The apex of the rectangular cube corner is positioned in the center of its rectangular aperture. As should be appreciated from FIGS. 13A-13C, as cutting scheme parameters differ, the geometrical properties of the full cube corners also differ. A typical example is that making one set of cuts, for instance 'C' cuts deeper or shallower, may shift the apex position from the center of the full cube corner to the left or to the right in the rectangular aperture.

Figure 14C:
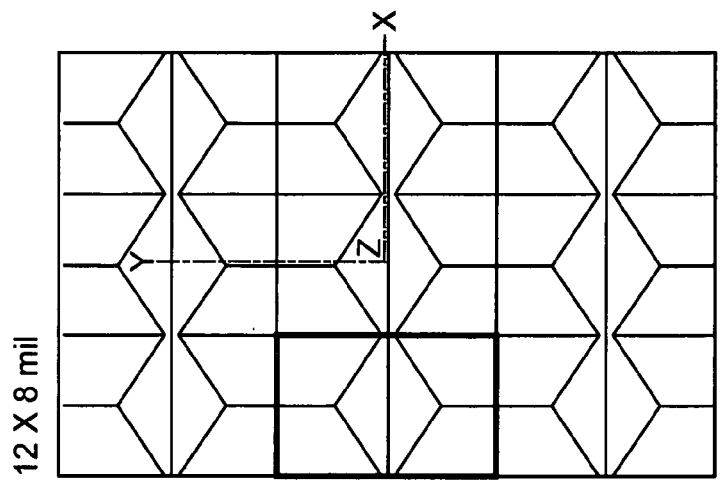
FIGS. 14A-14C illustrate pin bundles featuring pins with cube corner configurations obtained using the cutting scheme shown in FIGS. 12A-12C, respectively.
Figure 14B:
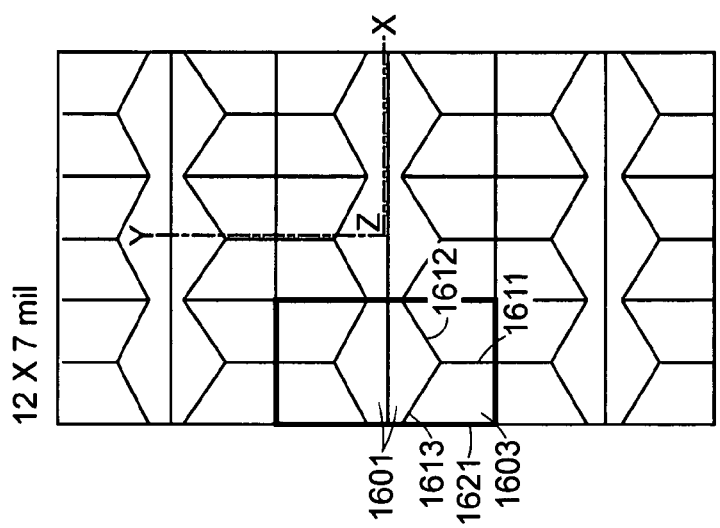
Figure 14A:
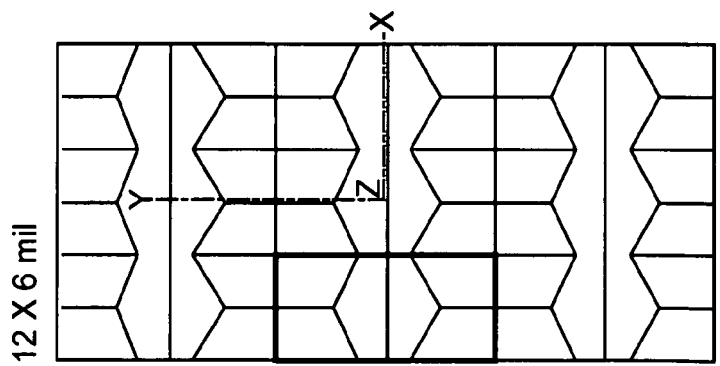

FIGS. 14A-14C illustrate the re-bundling molds of the rectangular pins comprising a pair of cube corners shown in FIGS. 13A-13C, respectively. Each mold of the rectangular cube corners of FIGS. 14A-14C includes a darkened rectangular outline, which defines a single rectangular pin with a pair of cube corners. As shown in FIG. 14B, both the top cube corner and the bottom cube corner in the darkened area comprise three facets labeled as 1601, 1602, and 1603 and three edges labeled as 1611, 1612, and 1613. Two facets 1601 were created by a 'C' cut with the first tool providing two side walls of the 'C' groove. The facet 1602 was created by an 'A' cut provided by the second tool and the facet 1603 was created by a 'B' cut also provided with the same second tool. The three 'A,' 'B,' and 'C' cuts also generate three edges 1611, 1612, and 1613 and three dihedral angles, which may be labeled as 1611, 1612, and 1613 as well. There are four corner points of the rectangular aperture, which are also the outer points of the facets 1602 and 1603. They are located on the bottom lines of two 'A' cuts and two 'B' cuts.

FIGS. 15A-15C and 16A-16C illustrate side views along a y and x axis, respectively, of the re-bundled pins of FIGS. 14A-14C. As shown in FIG. 15B, the darkened lines represent a side view of the pair of cube corners shown in FIG. 14B. Two edges 1611 and 1613 and an outer edge 1621 of the facet 1603 in FIG. 14B are also indicated in the FIG. 15B.

FIG. 16A-16C illustrate a rectangular cube corner's front view and two side views, which are copied from the darkened rectangle in FIG. 13B, the side view of bold line in FIG. 14B, and the bold line view in FIG. 15B.

Figure 1A:
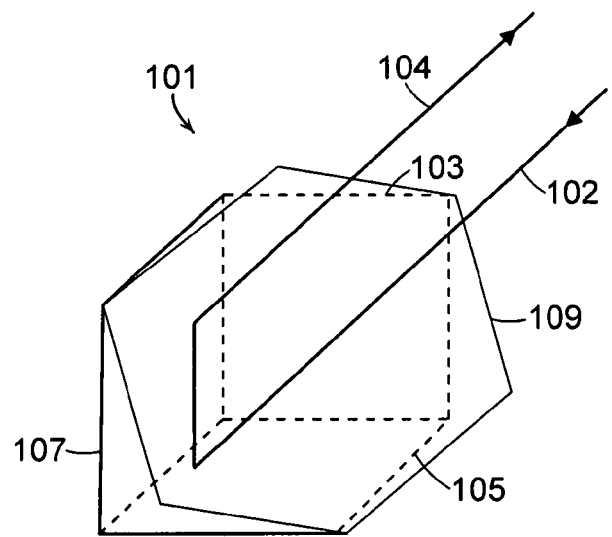
FIGS. 1A and 1B are illustrative examples of full cube corner and triangular cube corner geometries, respectively.
Figure 17:
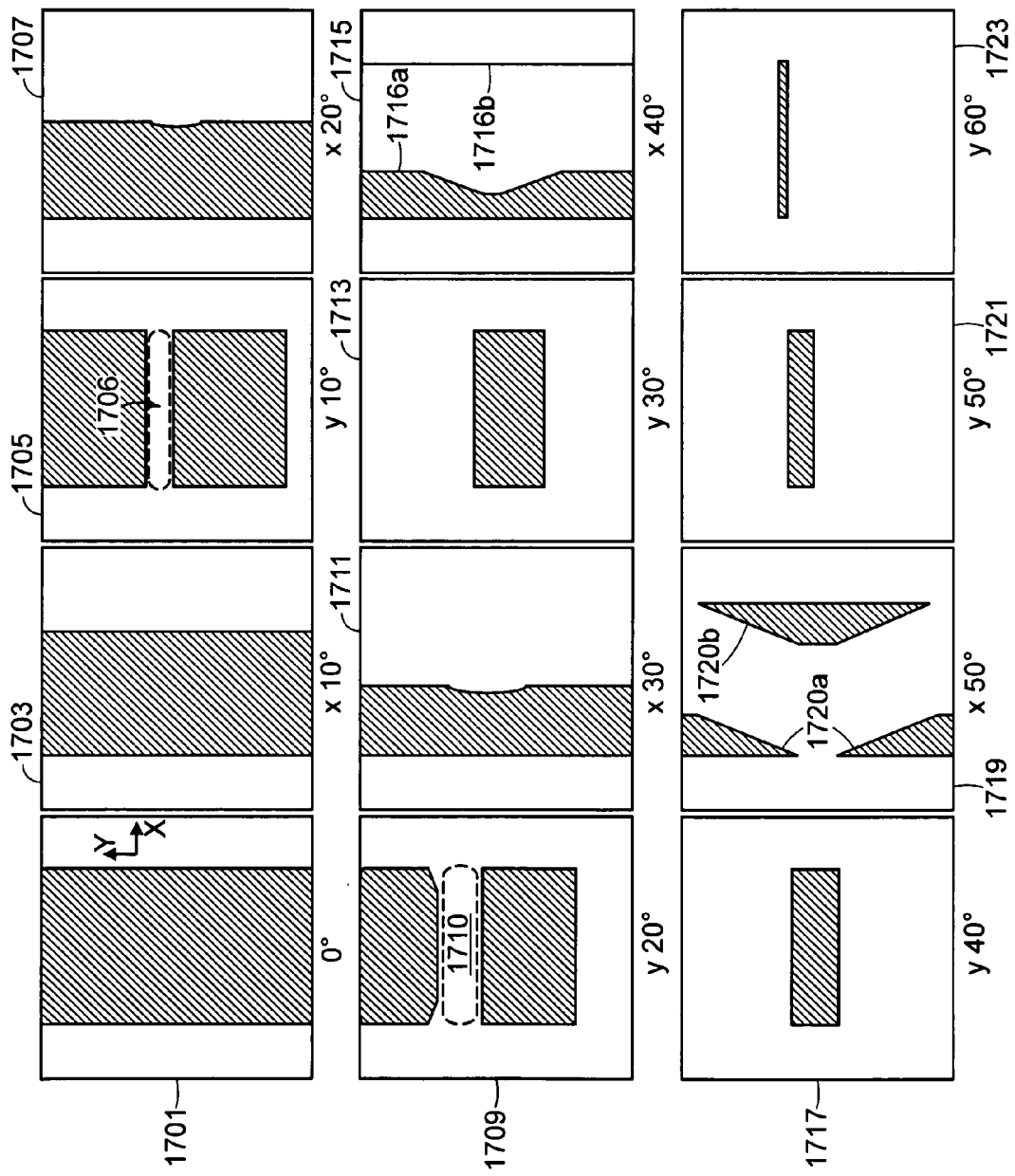
FIG. 17 illustrates ray trace results for the pin bundle shown in FIG. 13A.

FIG. 17 illustrates a number of ray trace results for a pair of rectangular cube corners of 0.012"×0.007" inch pin of the retroreflective article made from a mold formed from the rectangular pin bundle of FIG. 14B. The two rectangular cube corners in the pair are oriented in the vertical direction. The first ray trace result 1701 was obtained with a light at incident angle of 0° with respect to the normal of the pair of cube corners. As discussed in relation to FIG. 1A, a full cube corner may retroreflect a total amount of light incident on its whole aperture at 0° entrance angle. As shown in the ray trace result 1701, the darkened outline area represents the retroreflected light, which is equivalent to the area of the corresponding aperture of the pair of rectangular cube corners, since at a 0° entrance angle the entire inner facets of the rectangular cube corners may be utilized in the retroreflectance. The darkened outline area is also called active area of a cube corner and a rectangular cube corner has 100% active area compared with its aperture at an entrance angle of 0°.

The second ray trace result 1703 illustrates the retroreflectance of light from the pair of rectangular cube corners similar to the ray trace of 1701, but in the ray trace of 1703, the entrance angle has been shifted by 10° in the x, or horizontal direction. As compared to the ray trace result of 1701, the ray trace result of 1703 illustrates a narrower retroreflectance or active area since less of the cube corner facets in the x direction is utilized. Similarly, the ray traces 1707 and 1711 also show much less retroreflectance or active areas as the entrance angle is shifted by 20° and 30°, respectively, along the x, or horizontal direction.

The ray trace result 1715 illustrates the retroreflection of a pair of rectangular cube corners where the entrance angle has been shifted by 40° along the horizontal direction. On the left of 1715 the active area 1716a of retroreflected light illustrates a retroreflection similar to what is illustrated in the ray trace results 1701, 1703, 1707, and 1711 where a greater angle shift along the x direction results in a narrower retroreflectance area. The active area 1716b of retroreflected light on the right of 1715 illustrates the retroreflectance from a nearby pair of cube corners in the mold.

Similarly, the ray trace result 1719 features a narrow retroreflectance area 1720a on the left due to the entrance angle of light being shifted by 50° in the x direction. The ray trace result 1719 also includes a retroreflectance area 1720b on the right due to the retroreflectance from a nearby pair of cube corners. Note that as the entrance angle is shifted by a greater amount in the x direction, the amount of retroreflectance from nearby full cube corners is increased, as the area of retroreflectance 1720b of ray trace result 1719 is greater than the area of retroreflectance 1716b of ray trace result 1715.

Shifting the entrance angle in the y, or vertical direction may result in a vertical disturbance in the retroreflected light. For example, the ray trace result 1705 illustrates the active area of retroreflectance when the angle of entrance is shifted by 10° upwards in the y, or vertical direction. As shown in the ray trace result 1705, the retroreflected light features an area 1706 that doesn't contribute any retroreflections. The darkened area of the retroreflectance on the top and above the non-reflectance area 1706 may be due to retroreflected light by the top rectangular cube corner in the pair, while the darkened area below the non-reflectance area 1706 may be due to the retroreflected light by the bottom cube corner in the pair. Similarly, in the ray trace result 1709 the area of non-reflectance 1710 is increased and two separated darkened active areas are decreased as the entrance angle is shifted further along the y direction by 20° upwards.

The ray trace result 1713 illustrates the retroreflection of light with an entrance angle 30° in the y direction. The retroreflected light featured in the ray trace result 1713 is attributed by the bottom cube corner in the pair. Thus, due to the amount of angle shifted in the y direction upwards, light is no longer retroreflected by the top cube corners in the pair. Similarly, ray trace results 1717, 1721, and 1723 feature decreasing active areas of retroreflected light by the bottom cube corner in the pair at the entrance angles of 40°, 50°, and 60° in the y direction upwards, respectively. For a 30° entrance angle or larger in y direction downwards the retroreflected light is only attributed by the top cube corner in the pair not the bottom one.

Therefore, as the entrance angle in the y direction increases beyond 30 degrees, the number of cube corners attributing to the retroreflected light in the y direction decreases to the half. Conversely, as the entrance angle in the x direction increases beyond 30 degrees, the number of cube corners attributing to the retroreflected light in the x direction increases to have some nearby cube corners outside the incident light area join the reflections.

Figure 1B:
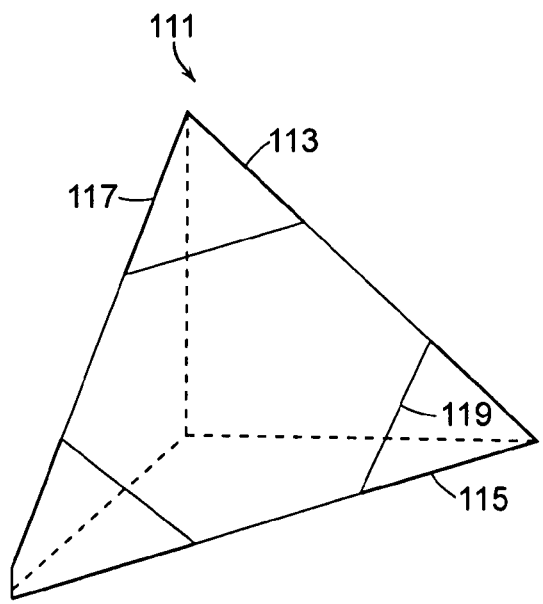
Figure 18A:
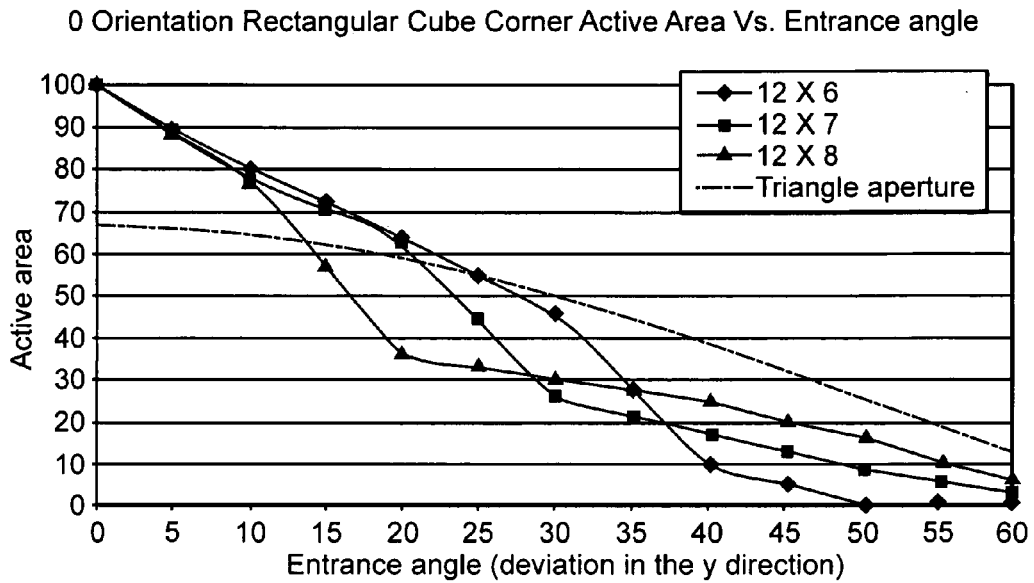
FIG. 18A illustrates a comparison between the cube corner rectangular pins of FIGS. 13A-13C and a triangular cube corner of active area versus entrance angle at a 0° degree orientation.

FIG. 18A shows a comparison between a pair of rectangular full cube corners made from a mold using three rectangular pins, 0.012"×0.006", 0.012"×0.007", and 0.012"×0.008" inches, of FIGS. 14A-14C, and a pair of triangular cube corners, which was explained in relation to FIG. 1B. The comparison is based on a percentage the area attributed to the retroreflectance of the incident light, or the active area, versus the entrance angle shifted in the y, or vertical direction, or 0° orientation of the pair of rectangular full cube corners. As shown in the chart of FIG. 18A, at a 0° deviation the active area is 100% meaning that the whole aperture of the cube corner contributes the retroreflection of the incident light for three rectangular full cube corners, as this is a property of all full cube corners. In the chart of FIG. 18A, a solid line with rhombuses represents the rectangular aperture of 0.012"×0.006"; a solid line with squares represents the 0.012"×0.007" rectangular aperture, and a solid line with triangles indicates the 0.012"×0.008" rectangular aperture. The triangular aperture of normal cube corners, however, only contributes about 67% of its aperture as an active area at a 0° entrance angle as depicted by a dished line in the chart.

As the amount of deviation in the entrance angle increases, the amount of active area utilized in the retroreflectance of light from the rectangular apertures of three cube corners, as well as the triangular aperture, is decreased. In the entrance angle range of from 0° to around 20° as shown in the chart FIG. 18A the retroreflectance of light in the three rectangular cube corner apertures is achieved with the utilization of a greater active area as compared to the triangular aperture of the triangular cube corner. Particularly, the margin angle for aperture of 0.012"×0.006" is about 24°, the margin angle for aperture of 0.012"×0.007" is about 22°, and the margin angle for aperture of 0.012"×0.008" is about 14°. For entrance angle around 30° and greater as shown in the chart FIG. 18A, the triangular aperture of triangular cube corner utilizes the greatest active area during the retroreflection as compared to the three rectangular apertures. For larger entrance angles (e.g., 40°-60°) among the three rectangular full cube corners as shown in the chart FIG. 18A, the 0.012"×0.008" rectangular aperture utilizes the largest active area percentage, followed by the 0.012"×0.007" rectangular aperture utilizing a smaller percentage, and thereafter followed by the 0.012"×0.006" rectangular aperture utilizing an even smaller percentage of active area.

Figure 18B:
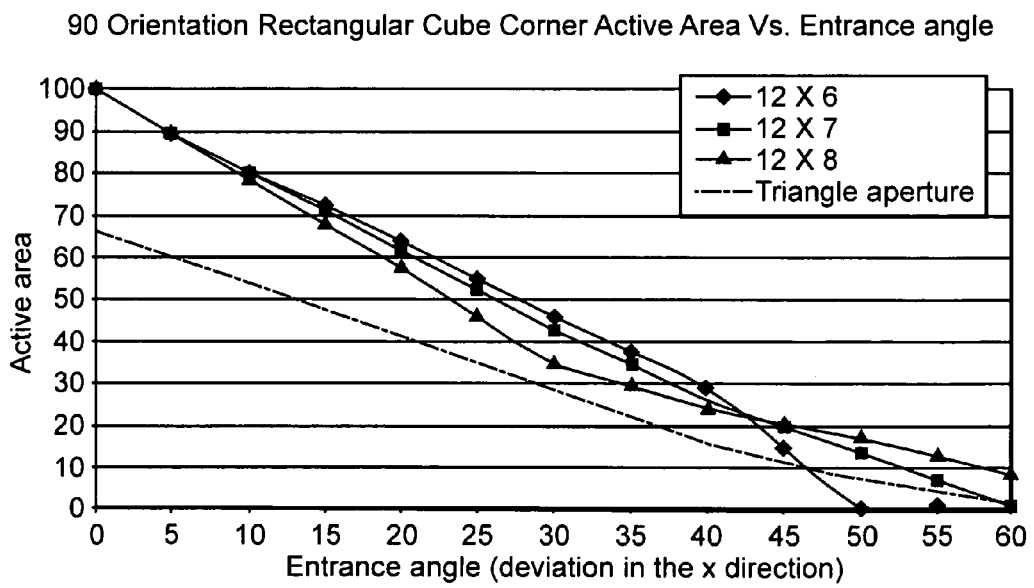
FIG. 18B illustrates a comparison between the cube corner rectangular pins of FIGS. 13A-13C and a triangular cube corner of active area versus entrance angle at a 90° degree orientation.

FIG. 18B also shows a comparison between three rectangular full cube corner apertures, 0.012"×0.006", 0.012"×0.007", and 0.012"×0.008" of FIGS. 14A-14C, and a triangular aperture cube corner, which was explained in relation to FIG. 1B. The comparison of FIG. 18B is based on a percentage of the aperture area attributed to the retroreflectance of light, or the active area, versus the entrance angle deviated in the x, or horizontal direction, or 90° orientation of the rectangular full cube corners. As shown in FIG. 18B, at a 0° entrance angle 100% of the active area is utilized for the retroreflectance of the three rectangular full cube corners. The triangular aperture cube corners however only utilizes about 67% of its active area at a 0° entrance angle as indicated by a dashed line in the chart of FIG. 18B.

As the amount of deviation in the entrance angle at 90° orientation increases, the amount of active area utilized in the retroreflectance of light in all four cube corners is decreased as shown in FIG. 18B. Throughout the entire entrance angle range from 0° to 60° the retroreflection of incident light in each of the three rectangular full cube corners is achieved with a greater active area as compared to the triangular aperture of traditional cube corner, with the exception of the 0.012"×0.006" rectangular cube corner, which utilizes less active area then the triangular aperture in the 47°-60° entrance angle range.

Figure 19B:
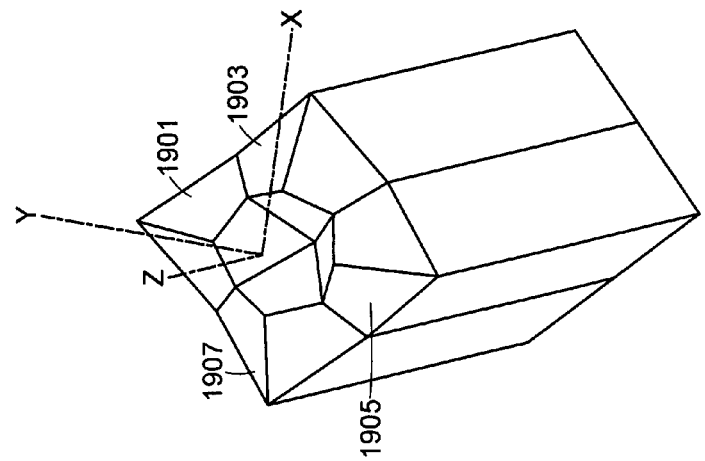
FIGS. 19B and 19C illustrate a three dimensional perspective view of a sub-pin bundle and a full bundle featuring cube corner rectangular pins, respectively.
Figure 19A:
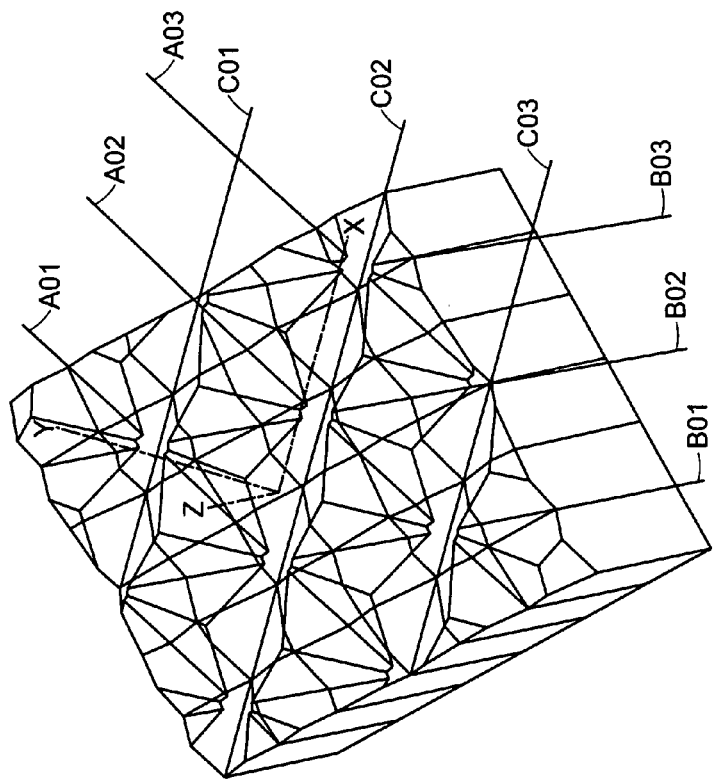
FIG. 19A is a three dimensional perspective view of a pin bundle featuring rectangular cross sectional pins having undergone a cutting scheme where at least one cut includes a different depth value.

FIG. 19A-19B illustrate another embodiment, a number of pins featuring a square cross section, or aperture, may be utilized in making a retroreflective sheeting comprising full cube corner surface configurations. FIG. 19A illustrates 3D view of a pin bundle of 6×6 square pins having undergone three sets of parallel cuts in different directions. The first set of parallel cuts are A01-A03 in an 'A' direction, the second set of parallel cuts are B01-B03 in a 'B' direction, and the third set of parallel cuts are C01-C03 in a 'C' direction. The cut line C02 connects the left corner point of the big bundle square of 6×6 square pins and its right corner point as shown in FIG. 19A, which passes all 6 square pins in the diagonal line of the bundle square along the diagonal of each of 6 pins. The cut line C01 connects the left corner point of a sub bundle square of 3×3 square pins on the top right and its right corner point as shown in FIG. 19A, which passes all 3 square pins in the diagonal of the sub bundle square. The cut line C03 connects the left corner point of a sub bundle square of 3×3 square pins on the left bottom and its right corner point as shown in FIG. 19A, which passes all 3 square pins in the diagonal of the sub bundle square. The cut line A01 connects the left bottom corner point of third square pin in the left column and the right top corner point of the second pin in the far right column as shown in FIG. 19A, which passes the upright point of the third pin in the third column. The cut line A02 connects the left bottom corner point of fifth square pin in the left column and the right top corner point of the fourth pin in the far right column as shown in FIG. 19A, which passes the upright point of the fifth pin in the third column. The cut line A03 connects the left bottom corner point of last square pin in the third column and the right top corner point of the sixth pin in the far right column as shown in FIG. 19A. The 'B' cut line B01,B02, and B03 connects the cross point between 'A' cuts A01, A02, and A03 and 'C' cuts C01, C02, and C03 in a manner all 'B' cut lines are symmetric to 'A' cut line with respect to C cut lines.

In the example provided by FIG. 19A, the 'A' and 'B' cuts comprise an equal pitch value and an equal depth value, while the 'C' cut comprises a larger pitch and a larger depth value than the 'A' or 'B' cut. Particularly, each pin in the bundle comprises a square cross section of 0.006×0.006", the 'C' cut has a pitch of 0.012728 inches and a depth of 0.073485". The 'A' and 'B' cuts comprise a pitch of 0.113842" and a depth of 0.055114". As shown in FIG. 19A, the 'A' and the 'B' cuts do not horizontally intersect, or cut through the v-shaped grooves created by the 'C' cuts. Similarly to the cutting schemes previously discussed, pins featuring a square cube corner on their top surface may be found in some of the triangles formed by the intersection of individual 'A,' 'B,' and 'C' cuts. But not in every triangle formed by individual 'A,' 'B,' and 'C' cuts a pin comprising a square cube corner could be found. Three are only four square pins in the diagonal of the big square bundle comprising cube corners on their top. The throughput of the square pin bundle and the above cutting pattern mentioned is roughly ⅛.

FIG. 19B illustrates a sub-set pin bundle of four pins 1901-1907 featuring square cube corner on their top surface. Notice that the grouping of four pins featuring the square cube corners forms an inverted substantially octagon shaping around its center. It should be appreciated that the orientation shown in FIG. 19B is merely an example and the pins may be stacked in any other orientation due to the symmetry of the square cross section of pins.

Figure 19D:
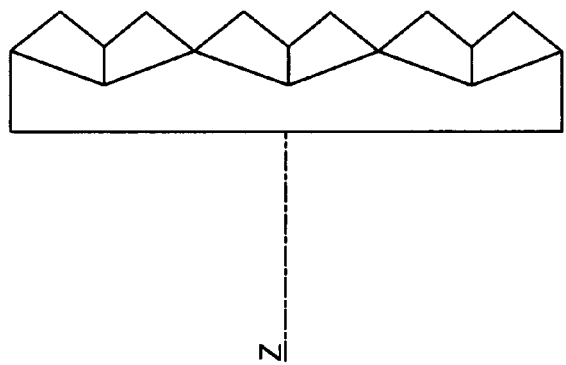
FIGS. 19D and 19E illustrate side views of the pin bundle of FIG. 19C.
Figure 19C:
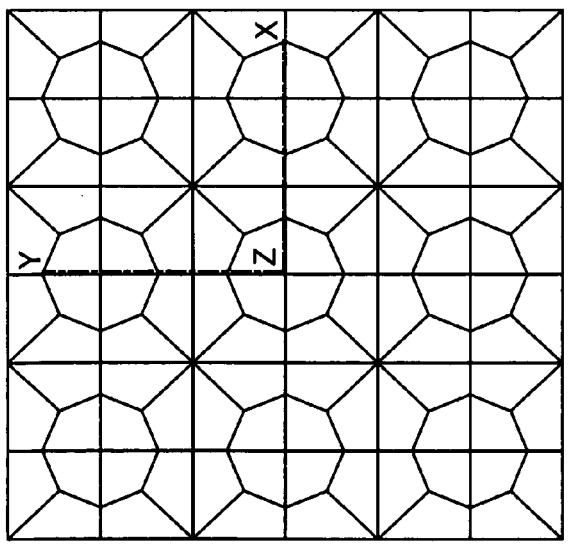
Figure 19E:
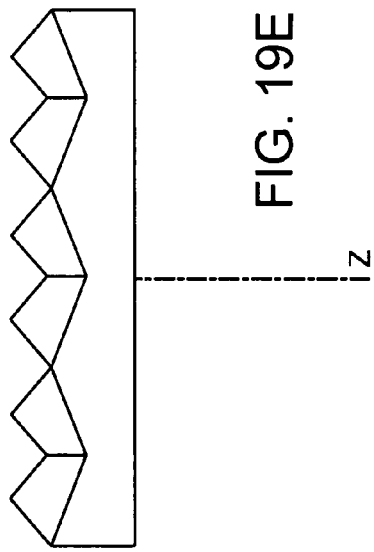

FIG. 19C illustrates a top view of a cube corner mold including 9×9 sub pin bundles of FIG. 19B, which features a square cube corner top surface configurations. FIGS. 19D and 19E illustrate side views of the mold along the y and x axis, respectively.

It should also be appreciated that the pins may be formed from a number of materials. A few examples of possible materials may be polyethylene, teraphthalate, polymethyl methacrylate, polycarbonate, brass, nickel, copper, or aluminum.

It should also be appreciated that the methods illustrated above may be employed in the production of a retroreflective sheeting featuring a top surface configuration of any shape, for example a triangular cube corner.

It should be understood that the cutting process, disclosed herein, may be implemented by a computer controlled cutting machine using instructions implemented in hardware, firmware, or software. If implemented in software, the software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

While the above has now particularly shown and described example embodiments thereof, it will be understood by those skilled in the art that various changes in form and details may be made therein without departing from the scope of the invention encompassed by the appended claims.

What is claimed is:

1. A method for making a mold for forming a retroreflective sheeting, the method comprising:
   forming a pin bundle from a plurality of pins;
   leveling a top and a bottom surface of the pin bundle;
   machining the top surface of the pin bundle with a diamond turning tool to provide predefined shapes for each pin on the top surface, wherein machining further comprises cutting three sets of parallel lines, each set being in a different axial direction, with a pitch of at least two of the sets being of equal value, and the pitch of the three sets being larger than the dimensional cross section of each pin in the pin bundle;
   selecting a sub-set of pins from the pin bundle to form a sub-set bundle, each pin in the sub-set bundle having a same predetermined shape; and
   electroforming the sub-set bundle to provide the mold.

2. The method of claim 1 wherein the cutting of each of the three sets of parallel lines comprises an associated tool tilt angle.

3. The method of claim 1 wherein the predetermined shape has three smooth and retroreflective surfaces.

4. The method of claim 2 wherein the predetermined shape is a full cube corner and the three tool tilt angles comprise an equal value.

5. The method of claim 4 wherein the pins have a hexagonal cross section.

6. The method of claim 5 wherein the full cube corner includes a hexagonal aperture and the cube corner has three facets, each facet including a polygon boundary of equal value.

7. The method of claim 6 wherein the polygon is a rectangle, square, or pentagon.

8. The method of claim 4 wherein the pins have a rectangular cross section.

9. The method of claim 8 wherein the full cube corner includes a rectangular aperture, and the full cube corner also includes first and second facets including a trapezoid boundary of equal value and a third facet having a symmetrical polygon boundary.

10. The method of claim 4 wherein the pins have a circular cross section.

11. The method of claim 10 wherein the full cube corner includes a circular aperture and, the full cube corner also includes three facets with a same circle sector boundary including a 90° center angle.

12. The method of claim 1 wherein the pins have a diameter on the order of 10 to 5000 microns.

13. The method of claim 1 wherein the pins are formed from a material selected from the group consisting of polyethylene, teraphthalate, polymethyl methacrylate, polycarbonate, brass, nickel, copper, and aluminum.

14. The method of claim 1 further comprising:
   specifying diamond turning tool configurations selected from the group consisting of pitch, tilt angle, cutting angle, and depth.

* * * * *